(12) United States Patent
Browning et al.

(10) Patent No.: US 6,669,780 B2
(45) Date of Patent: Dec. 30, 2003

(54) COLOR CHANGE BOOTH

(75) Inventors: James M. Browning, Burnsville, MN (US); Timothy C. Buyck, Rosemont, MN (US); James E. Johnson, Apple Valley, MN (US); Michael S. Smith, Indianapolis, IN (US); Michael J. Thies, Indianapolis, IN (US)

(73) Assignee: Illinois Tool Works Inc., Glenview, IL (US)

( * ) Notice: Subject to any disclaimer, the term of this patent is extended or adjusted under 35 U.S.C. 154(b) by 2 days.

(21) Appl. No.: 09/982,581

(22) Filed: Oct. 18, 2001

(65) Prior Publication Data

US 2002/0046701 A1 Apr. 25, 2002

Related U.S. Application Data

(60) Provisional application No. 60/242,937, filed on Oct. 24, 2000.

(51) Int. Cl.[7] ............................................. B05B 05/00
(52) U.S. Cl. .................... 118/326; 118/308; 118/309; 427/421; 427/424; 454/50
(58) Field of Search .................. 118/634, 308, 118/309, 326; 427/345, 421, 424; 454/50

(56) References Cited

U.S. PATENT DOCUMENTS

| | | |
|---|---|---|
| 4,099,937 A | 7/1978 | Ufken et al. |
| 4,144,043 A | 3/1979 | Johnston |
| 4,162,906 A | 7/1979 | Sullivan et al. |
| 4,204,849 A | 5/1980 | Johnston |
| 4,260,400 A * | 4/1981 | Scalet ........................ 55/290 |
| 4,351,567 A | 9/1982 | Gillingham |
| 4,409,009 A * | 10/1983 | Lissy ........................ 55/302 |
| 4,471,715 A | 9/1984 | Gubler et al. |
| 4,514,193 A | 4/1985 | Booth |
| 4,704,953 A * | 11/1987 | Wilson ........................ 454/53 |
| 4,770,118 A * | 9/1988 | Vohringer et al. .......... 118/312 |
| 4,851,261 A | 7/1989 | Gelain et al. |
| 4,852,513 A | 8/1989 | Hayes |
| 4,886,011 A | 12/1989 | Gelain |
| 4,898,116 A | 2/1990 | Kozoe et al. |
| 5,259,879 A | 11/1993 | Khattab et al. |
| 5,417,765 A | 5/1995 | Otani et al. |
| 5,456,023 A | 10/1995 | Farnan |
| 5,669,949 A | 9/1997 | Dudrey et al. |
| 5,683,479 A | 11/1997 | Gillingham et al. |
| 5,690,995 A | 11/1997 | Fischli et al. |
| 5,759,271 A | 6/1998 | Buschor |
| 5,776,249 A | 7/1998 | Rutz |
| 5,788,728 A | 8/1998 | Solis et al. |
| 5,833,751 A | 11/1998 | Tucker |
| 5,928,395 A | 7/1999 | Glen et al. |
| 5,975,874 A | 11/1999 | Daly et al. |

* cited by examiner

Primary Examiner—Richard Crispino
Assistant Examiner—Michelle Acevedo Lazor
(74) Attorney, Agent, or Firm—Lisa M. Soltis; Mark W. Croll; John H. Pilarski

(57) ABSTRACT

A booth of a powder coating system is designed for quick color changes. The booth includes a bottom wall supported above a floor. An inner space of the booth is defined above the bottom wall and an equipment-receiving space is defined beneath the bottom wall. The bottom wall has an opening providing communication between the inner space and the equipment-receiving space. The booth is adapted to receive a powder-recovery module beneath the bottom wall in the equipment-receiving space.

38 Claims, 14 Drawing Sheets

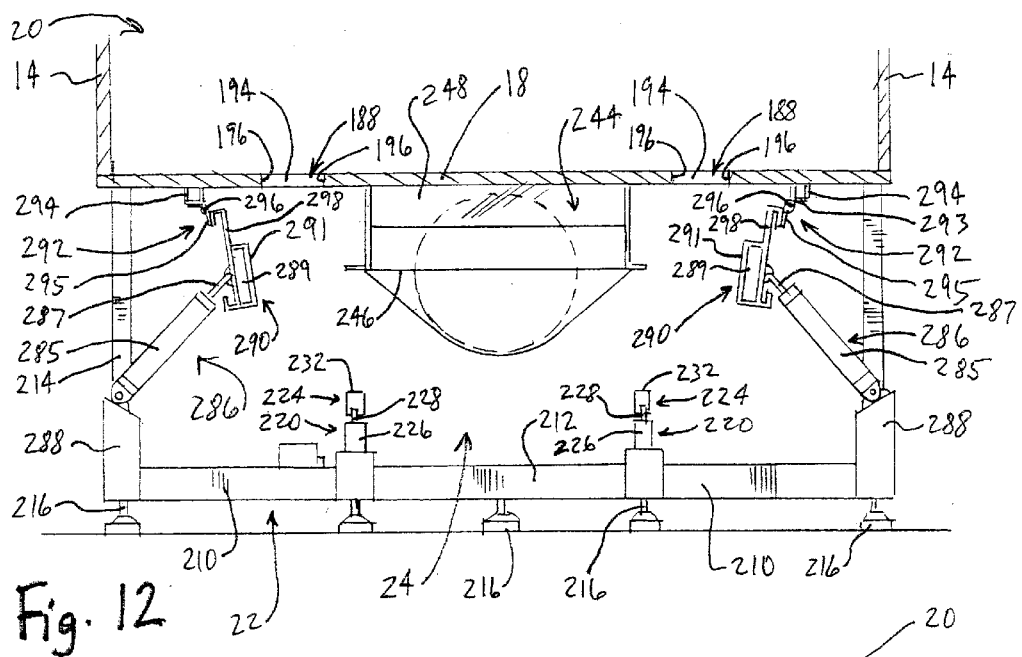
Fig. 12
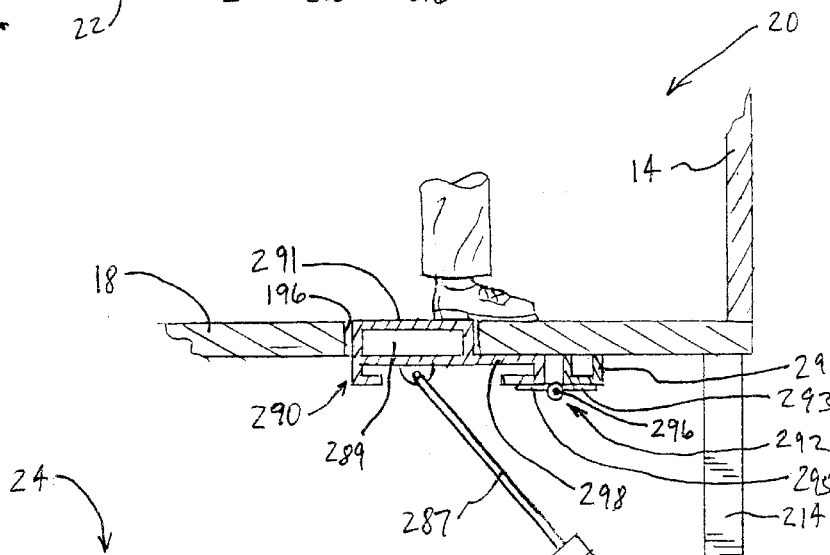
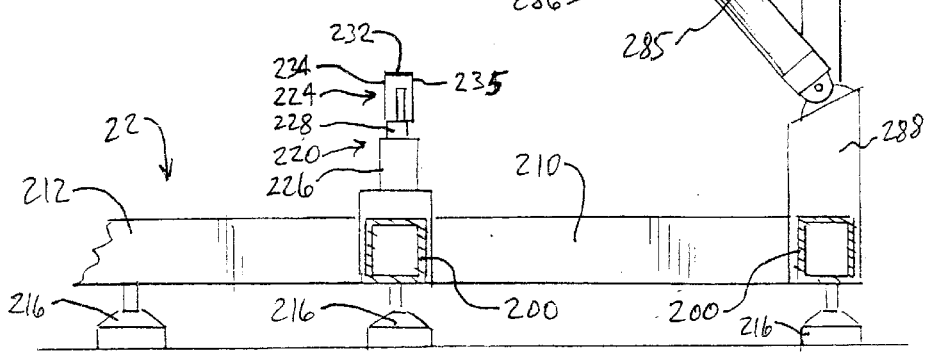
Fig. 13

COLOR CHANGE BOOTH

CROSS-REFERENCE TO RELATED APPLICATIONS

This patent application claims priority under 35 U.S.C. §119(e) to U.S. Provisional Patent Application Serial No. 60/242,937, filed Oct. 24, 2000, the disclosure of which is hereby incorporated herein by reference.

BACKGROUND AND SUMMARY OF THE INVENTION

The present invention relates to a powder coating system and particularly, to a color change booth used in a powder coating system. More particularly, the present invention relates to a color change booth configured to permit recovery of powder that fails to adhere to objects being coated in the booth.

Powder coating systems that operate to apply a coating of electrostatically charged particles or powder to an object are known. A typical powder coating systems includes a booth through which objects to be coated with powder are conveyed and one or more powder applicators that spray electrostatically charged powder toward the objects to be coated. Some of the particles adhere to the object and some do not. Because powder is fairly expensive, it is desirable to recover the non-adherent powder for re-use in the powder coating system.

Powder is available in a variety of colors. When manufacturers change the color of powder being dispensed by the powder applicator(s), various components of the powder coating system need to be cleaned if powder is being recovered in such a way that powder of one color is not inadvertently contaminated with powder of another color so that it can be reused. It is also highly desirable for the color change process to be completed quickly to maximize utilization of the powder coating system.

According to one aspect of the invention, a booth is provided for use in a powder coating system. The booth includes booth walls defining an interior in which objects are powder coated. One of the booth walls is a bottom wall that underlies the inner space. The bottom wall includes at least one opening. An equipment-receiving space is defined beneath the bottom wall. The equipment-receiving space is adapted to receive powder recovery equipment placed beneath the bottom wall for recovery of powder which does not adhere to the objects.

In an illustrative embodiment, the booth includes at least a first actuator, such as a pneumatic, hydraulic or electric actuator, adapted to engage the powder recovery equipment to lift the powder recovery equipment toward the bottom wall. The illustrative booth also includes at least one door that is movable between a first position blocking the at least one opening and a second position away from the opening. The booth includes at least a second actuator that operates to move the door between the first and second positions. The illustrative booth includes a sensor that senses the presence of the powder recovery equipment in the equipment-receiving space. When the sensor senses the presence of the powder recovery equipment in the equipment-receiving space, the second actuator associated with the door is disabled so that the door is not moved from the first position to the second position.

According to another aspect of this invention, a booth is provided for use in a powder coating system. The booth includes booth walls defining an interior in which objects are powder coated. One of the booth walls is a bottom wall that underlies the inner space. An equipment-receiving space is defined beneath the bottom wall. The equipment-receiving space is adapted to receive powder recovery equipment placed beneath the bottom wall for recovery of powder which does not adhere to the objects. The booth includes a first actuator adapted to move powder-recovery equipment received in the equipment-receiving space between a first orientation spaced apart from the bottom wall and a second, powder recovery, orientation engaging the bottom wall.

According to another aspect of the invention, a booth is provided for use in a powder coating system. The booth includes booth walls defining an interior in which objects are powder coated. At least one of the booth walls is a bottom wall that underlies the inner space. The bottom wall includes an opening. An equipment-receiving space is defined beneath the bottom wall. The equipment-receiving space communicates with the interior through the opening. The equipment-receiving space is adapted to receive powder recovery equipment placed beneath the bottom wall for recovery of powder which does not adhere to the objects. The booth includes a door which is movable between a first orientation blocking the opening and a second orientation away from the opening. The door is in the second orientation when the powder recovery equipment is beneath the bottom wall.

Additional features of the invention will become apparent to those skilled in the art upon consideration of the following detailed description of a preferred embodiment exemplifying the best mode of carrying out the invention as presently perceived.

BRIEF DESCRIPTION OF THE DRAWINGS

The invention may best be understood by referring to the following detailed description and accompanying drawings which illustrate the invention. In the drawings.

Figure 1:
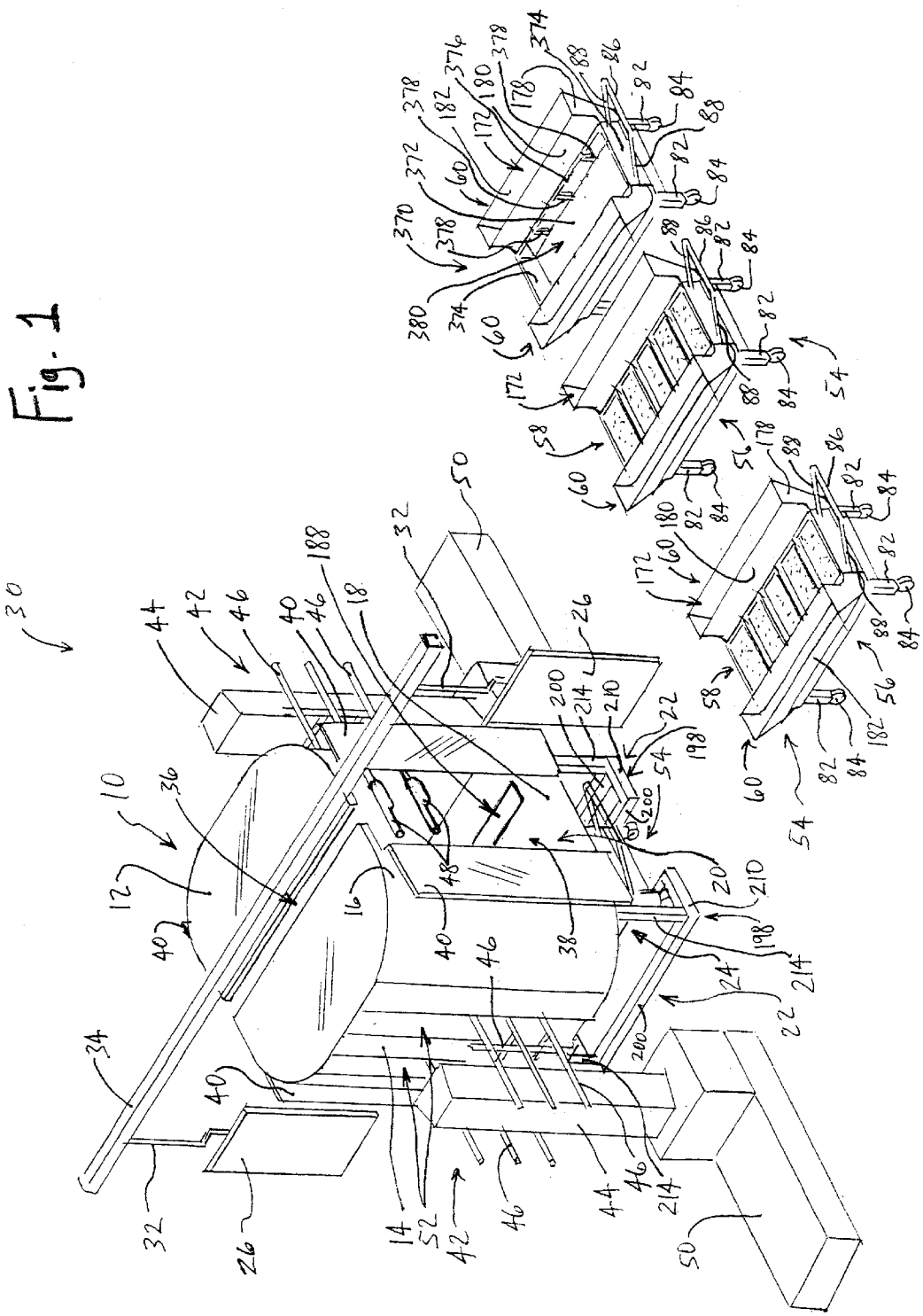
FIG. 1 illustrates a perspective view of a color change system constructed according to the invention showing multiple powder-recovery modules or carts and a spray-to-waste module or cart, all oriented side-by-side near a color change booth and showing a third powder-recovery module or cart situated in an equipment-receiving space of the booth.
Figure 8:
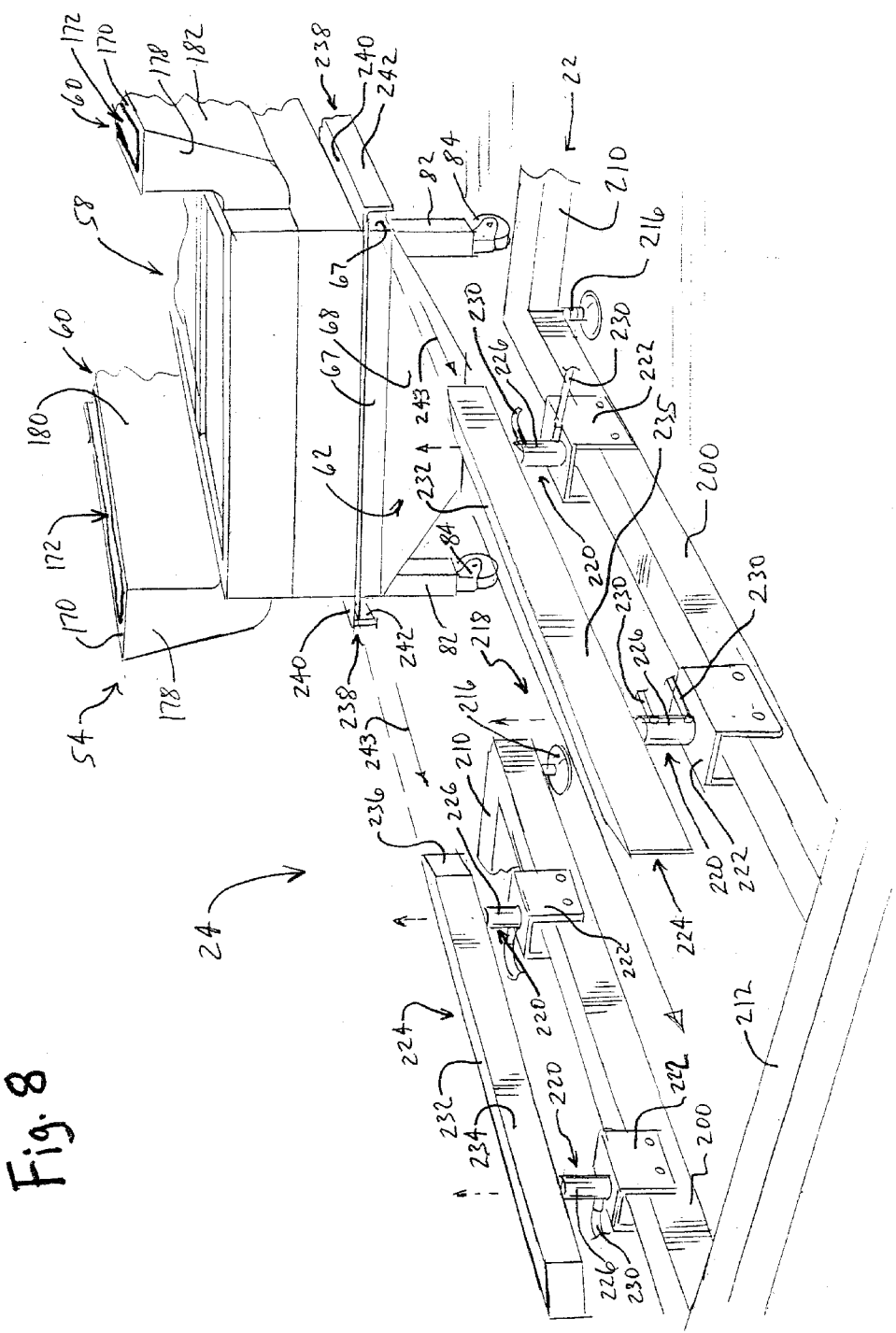
Figure 9:
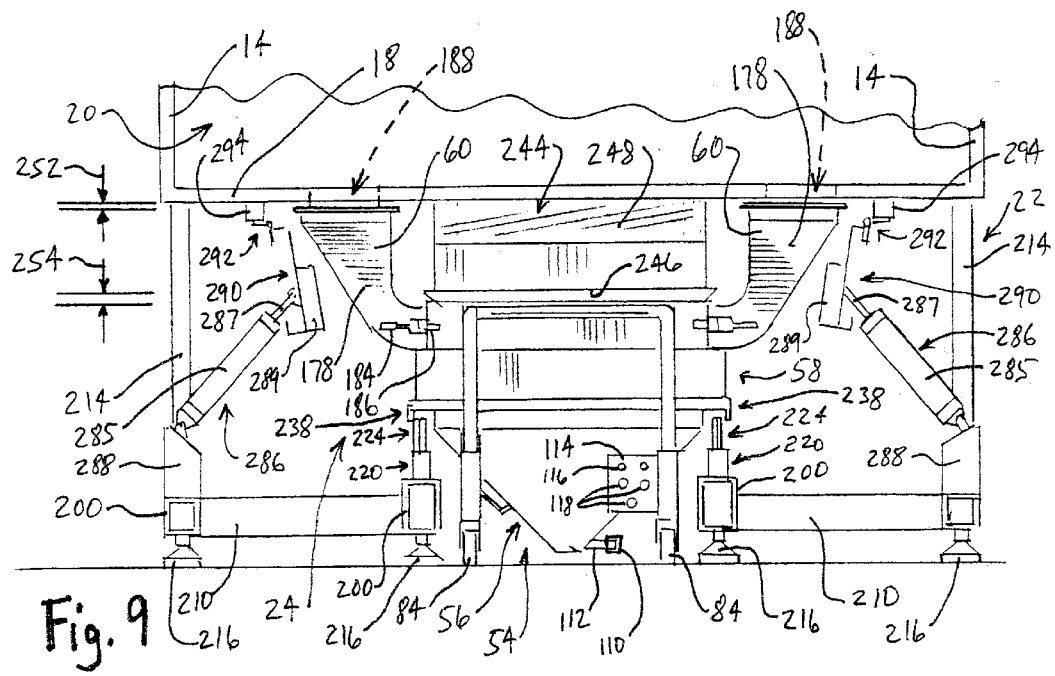
Figure 10:
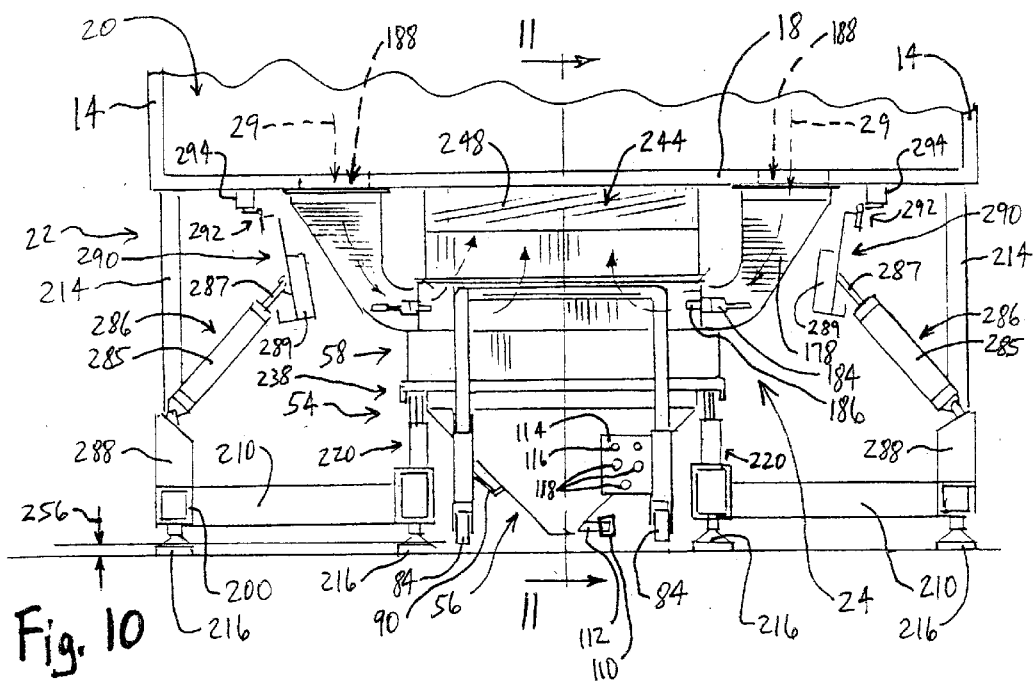
Figure 11:
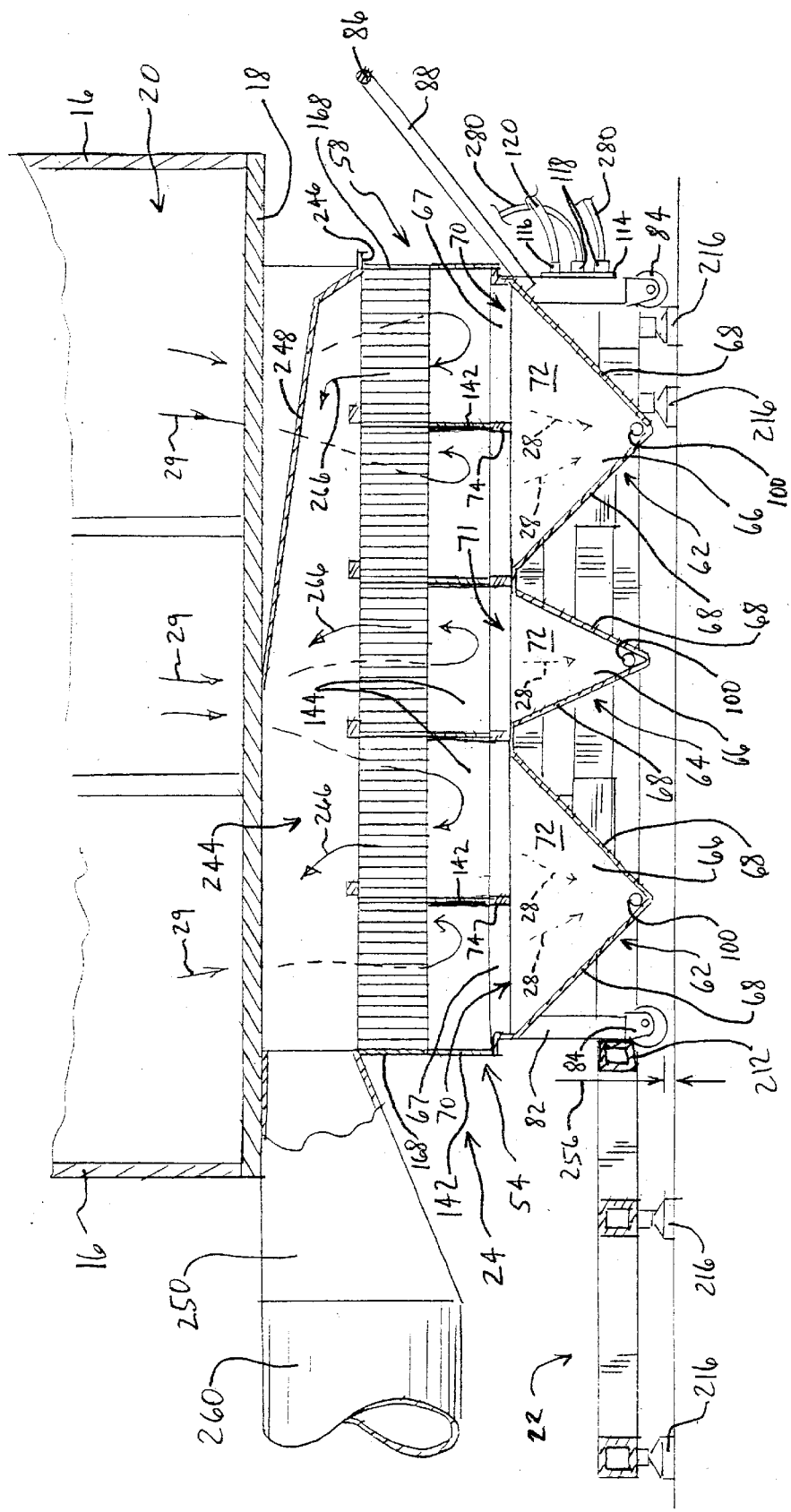
Figure 14:
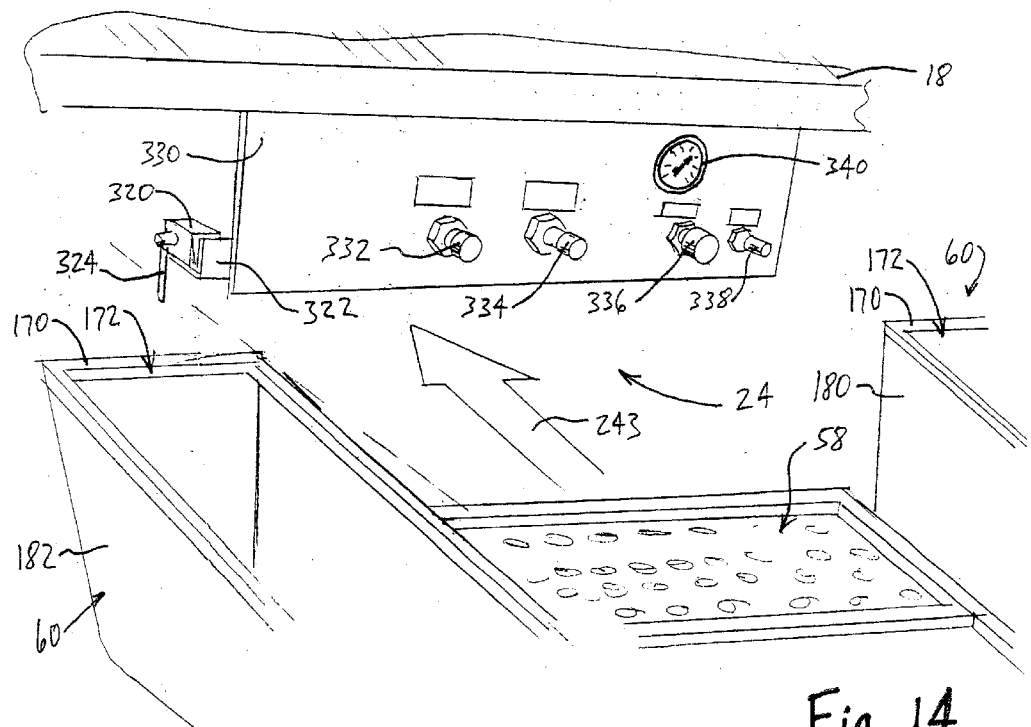
Figure 15:
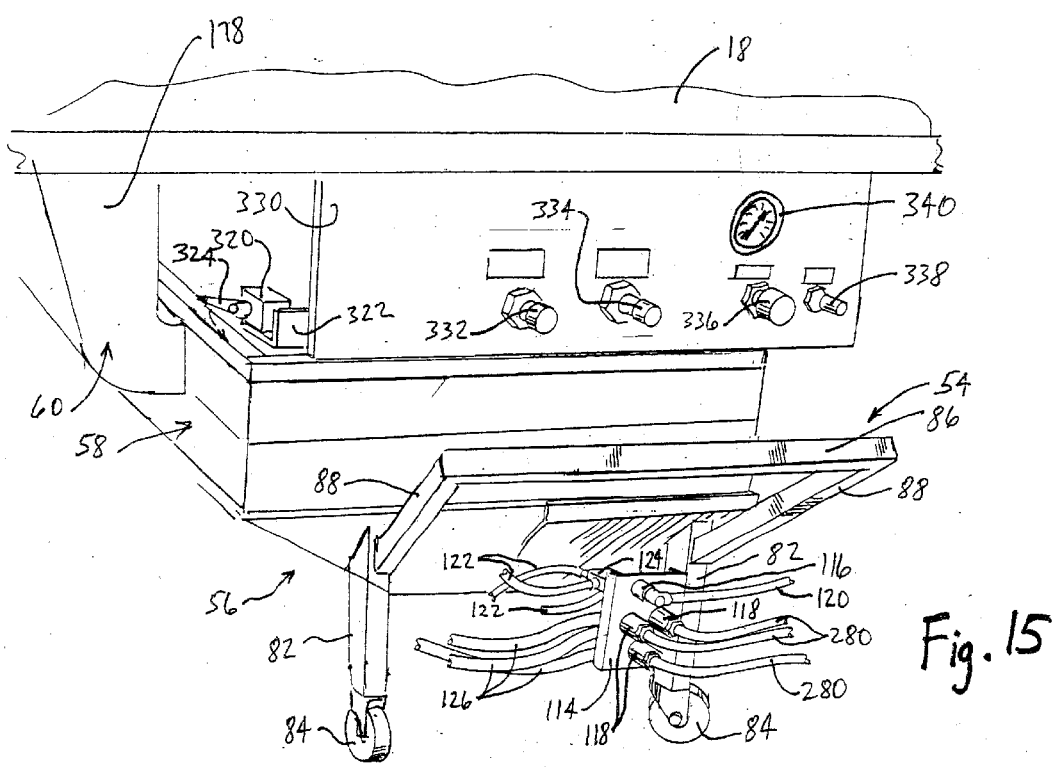
Figure 16:
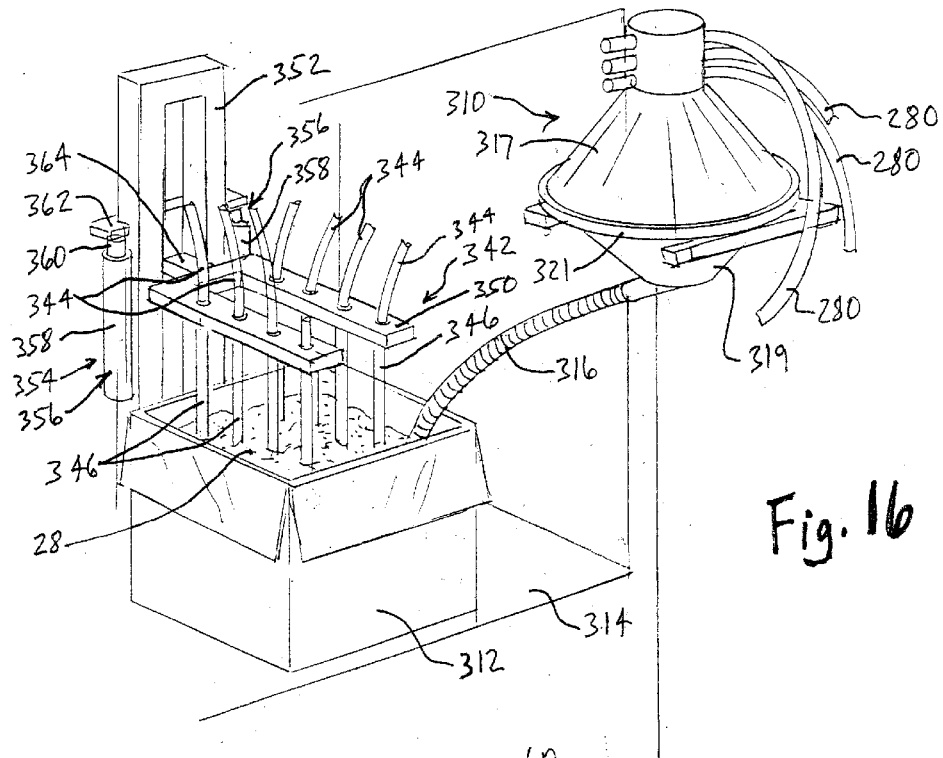
Figure 17:
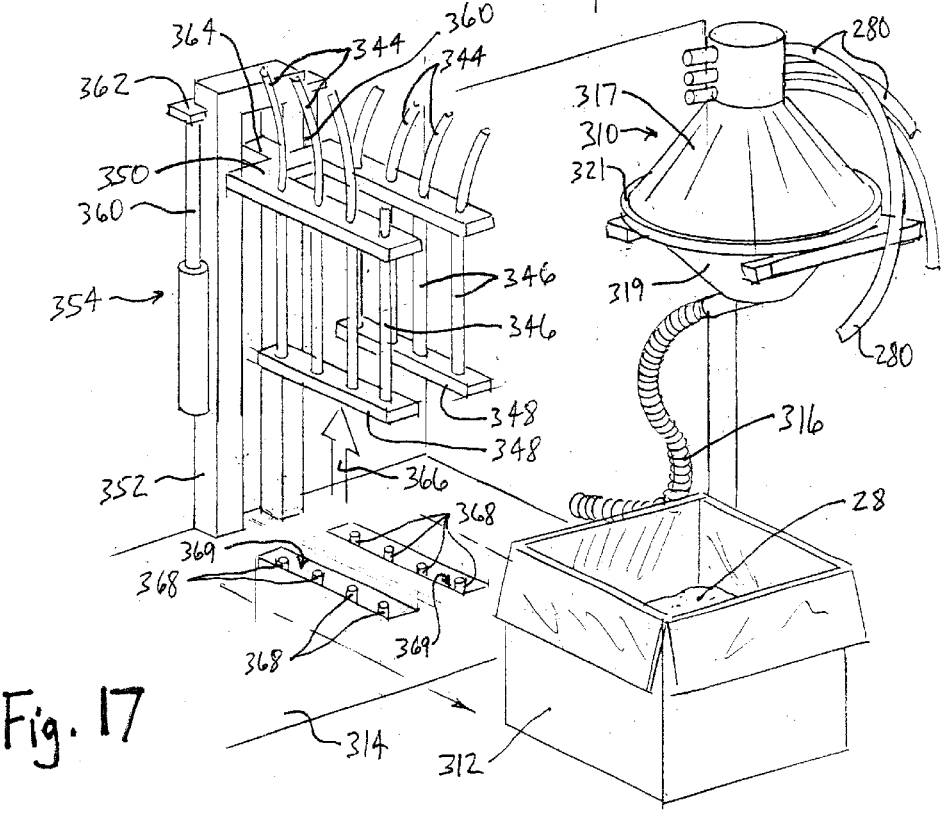
Figure 18:
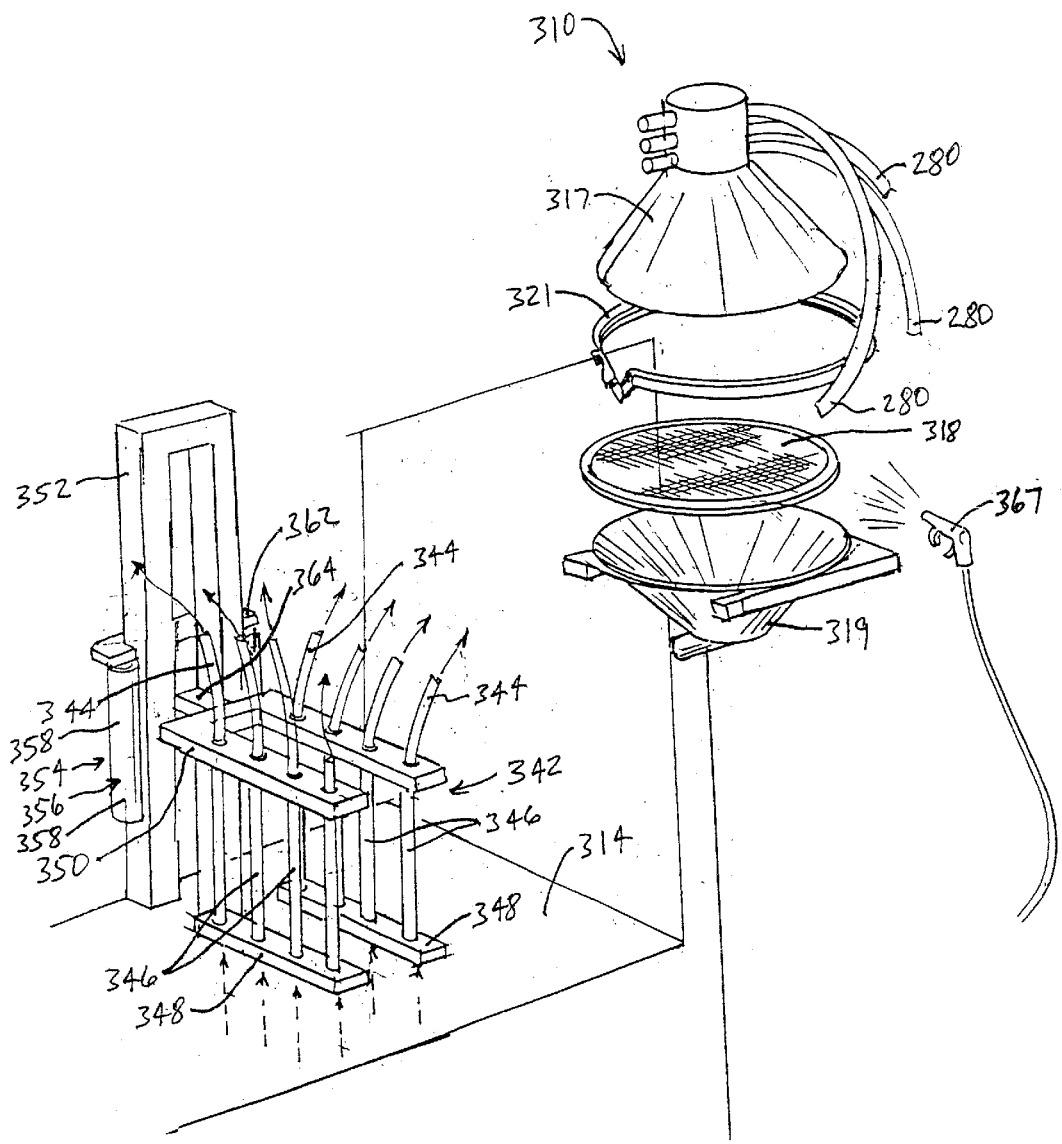

4, showing an air-powder mixture entering a plurality of separator tube assemblies, a quantity of recovered powder moving downwardly out of the separator tube assemblies, and air that is generally powder-free moving upwardly out of the powder tube assemblies;

FIG. 8 illustrates a fragmentary perspective view of portions of the booth and one of the powder-recovery carts illustrated in FIG. 1, showing the booth including lift rails supported relative to a frame of the booth by lift actuators. The powder-recovery cart including a pair of catch lips aligned with respective lift rails. The powder-recovery cart is illustrated arranged for movement into an equipment-receiving space of the booth;

FIG. 9 illustrates a fragmentary front elevation view of a portion of the booth and one of the powder-recovery carts. The cart is illustrated received in the equipment-receiving space of the booth. The wheels of the cart are illustrated resting on the floor. The upper surfaces of the ducts are spaced apart from a bottom wall of the booth;

FIG. 10 illustrates a fragmentary front elevation view similar to FIG. 9 showing the lift actuators actuated to lift the powder-recovery cart so that the wheels of the cart are spaced apart from the floor and so that the upper surfaces of the ducts engage an undersurface of the bottom wall;

FIG. 11 illustrates a fragmentary sectional view of a portion of the booth and one of the powder-recovery carts, taken generally along section lines 11—11 of FIG. 10. FIG. 11 illustrates the air-powder mixture moving downwardly from an inner space of the booth into the separator assembly, recovered powder moving downwardly from the separator assembly into the hopper assembly, and air moving upwardly from the separator assembly into an air duct of the booth that overlies the separator assembly;

FIG. 12 illustrates a fragmentary sectional view of a portion of the booth showing doors in the bottom of the booth in open orientations, uncovering openings in the bottom wall of the booth;

FIG. 13 illustrates an enlarged sectional view of certain details of FIG. 12 showing one of the doors moved by its actuator to a closed orientation to facilitate movement of workers around on the floor of the booth;

FIG. 14 illustrates a fragmentary perspective view of a portion of the booth and one of the powder-recovery carts showing a sensor on the booth having a lever which protrudes into the equipment-receiving space to serve entry of a powder recovery cart into the space;

FIG. 15 illustrates a perspective view similar to FIG. 14 showing the powder-recovery cart moved into the equipment-receiving space. The lever on the sensor is actuated, signaling the presence of the powder-recovery cart in the equipment-receiving space;

FIG. 16 illustrates a fragmentary perspective view of a portion of a powder-management booth showing a container of powder sitting on a shelf of the booth, a plurality of suction tubes in a lowered orientation to extract powder from the container for delivery to the powder applicators, a sieve having a frustoconical upper portion that receives recovered powder from the powder-recovery cart, and a hose extending from a frustoconical lower portion of the sieve to the container to deliver recovered powder to the container;

FIG. 17 illustrates a fragmentary perspective view of the same components as to FIG. 16 showing the plurality of suction tubes in a raised orientation to permit removal and replacement of the powder container. The lower end of the hose that extends from the sieve is illustrated removed from the container. The container is illustrated moved off of the shelf to expose an array of air nozzles; and FIG. 18 illustrates a fragmentary perspective view of some of the same components as FIGS. 16–17, showing the suction tubes engaging the air nozzles. Air is provided from the nozzles to the suction tubes and other passages in the powder applicators to clean these components of powder during color change operations. Components of the sieve are illustrated disassembled to permit cleaning of the sieve components, for example, with an air gun during a color change operation.

DETAILED DESCRIPTIONS OF ILLUSTRATIVE EMBODIMENTS

A powder coating system 30 includes a color change booth 10 in which objects 26 are coated with particles of powder 28. Powder coating system 30 also includes powder-recovery modules or carts 54 that are each individually insertable into an equipment-receiving space 24 provided by booth 10. Powder coating system 30 further includes a powder station 300, best illustrated in FIGS. 2 and 3, and powder applicators 42, best illustrated in FIGS. 1–3. Powder applicators 42 can be of any of a member of known types that electrostatically charge and spray powder 28 provided from powder station 300 toward objects 26 in booth 10. Air circulation equipment 258 of powder coating system 30 operates to create an air stream that flows through booth 10 and the cart 54 received in space 24. Some of the sprayed powder 28 adheres to objects 26 and some doesn't. The non-adherent powder 28 that becomes entrained in the air stream flowing through booth 10 forms an air-powder mixture 29. Air-powder mixture 29 flows from booth 10 into the powder-recovery cart 54 received in space 24 where powder 28 is separated from air-powder mixture 29 and returned to powder station 300 for reuse. When powder coating system 30 is changed from coating objects 26 with powder 28 of a first color to coating objects 26 with powder 28 of a second color, the cart 54 which has been used in the recovery of the powder 28 of the first color is exchanged for another cart 54 which will be used in the recovery of the powder 28 of the second color, and various components of powder coating system 30 are cleaned so that powder 28 of the first color is not inadvertently mixed with powder 28 of the second color.

Illustrative color change booth 10 includes a top wall 12, side walls 14, end walls 16, and a bottom wall 18 as shown in FIG. 1. Side walls 14 and end walls 16 extend substantially vertically between top wall 12 and bottom wall 18. In addition, side walls 14 blend together with end walls 16 to define rounded corner regions of illustrative booth 10. Booth 10, therefore, includes a plurality of walls 12, 14, 16, 18 that define an interior 20. Booth 10 includes a frame 22, a portion of which is positioned to lie beneath bottom wall 18, as best illustrated in FIG. 1. Frame 22 rests upon a floor and supports bottom wall 18 in spaced apart relation from the floor so that equipment-receiving space 24 is defined between bottom wall 18 and the floor.

By blending walls 14, 16 together at rounded corner regions of illustrative booth 10, the tendency of powder 28 to accumulate in these regions is less than if walls 14 and walls 16 intersected at sharper corners. However, it is within the scope of this disclosure for booth 10 to have walls 12, 14, 16, 18 that meet at sharp or blended corners. In addition, it is within the scope of this disclosure for walls 12, 14, 16, 18 to be made from any type of material having suitable structural rigidity. However the tendency of powder to accumulate on walls 12, 14, 16 is lessened if walls 12, 14, 16 are made from a non-metallic material, such as a transparent resin. In the illustrated embodiment, bottom wall 18 is constructed from a stainless steel material, and that attracts nonadherent, electrostatically charged powder 28 downwardly toward it.

Objects 26 are supported 32 from an overhead conveyor 34 as best illustrated in FIG. 1. Uncoated objects 26 are moved by conveyor 34 into interior space 20 of booth 10 where powder 28 is dispensed onto the objects 26. The objects 26 then continue on conveyor 34 out of interior space 20 of booth 10. Top wall 12 of booth 10 includes an elongated slot 36 and end walls 16 include openings 38 that accommodates the supports 32 by which objects 26 are transported through interior 20.

As objects 26 move into interior 20 of booth 10 prior to coating, supports 32 enter slot 36 at the front end thereof and objects 26 move through opening 38 in front end wall 16. As objects 26 move through interior 20 of booth 10 to be coated, supports 32 move through slot 36 from the front end thereof to the rear end thereof while carrying the associated objects 26 through the interior 20 of booth 10 to the rear of booth 10. After objects 26 are powder coated, objects 26 exit booth 10 through opening 38 in rear end wall 16 and supports 32 exit slot 36 at the rear end thereof. Booth 10 includes doors 40 that are movable between open orientations illustrated in FIG. 1, and closed orientations (not shown).

Figure 2:
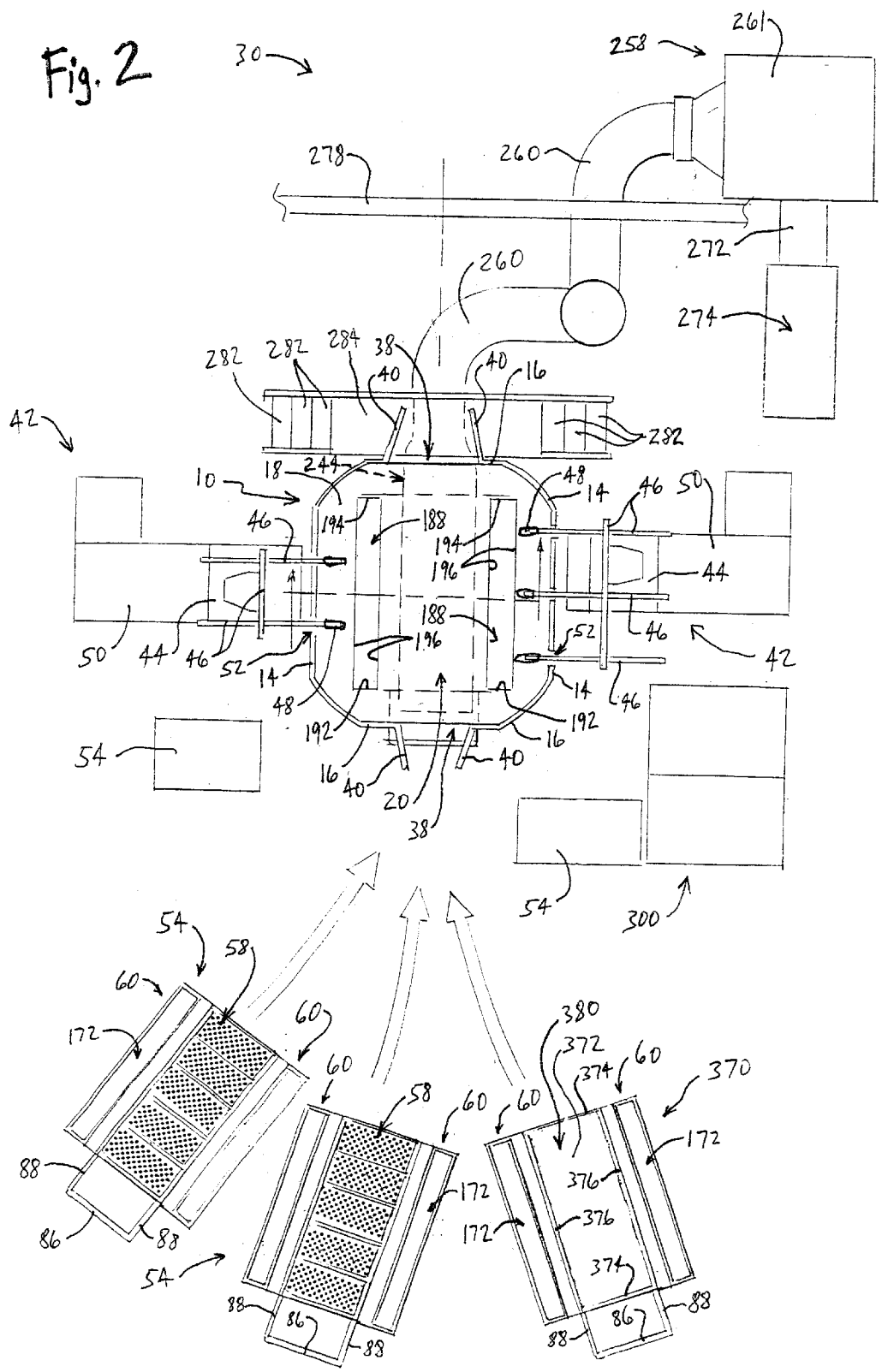
FIG. 2 illustrates a top plan view of the system illustrated in FIG. 1.

Powder coating system 30 includes one or more powder applicators 42 as illustrated in FIGS. 1 and 2. Each applicator 42 includes an in/out positioner 50, reciprocator 44 carried by positioner 50, supports 46 carried by reciprocator 44, and powder spray guns 48 mounted on the distal ends of supports 46. Side walls 14 of booth 10 are formed to include one or more vertical slots 52, best illustrated in FIGS. 1–2. Supports 46 extend from the associated reciprocator 44 through slots 52 so that guns 48 are supported in the interior 20 of booth 10.

When objects 26 are being coated with powder 28, reciprocators 44 operate under automatic control, which typically causes guns 48 to reciprocate up and down while electrostatically charged powder 28 is sprayed from guns 48 toward objects 26. Movement of guns 48 in this manner causes the cloud of powder 28 formed in interior 20 to be relatively more uniform, which promotes more even coating of objects 26. In some embodiments, reciprocators 44 also reciprocate guns 48 from side to side. Positioners 50 also typically operate under automatic control to project and retract associated reciprocators 44 and guns 48 horizontally in and out relative to booth 10. Such horizontal in and out positioning is desirable, for example, during cleaning operations and to compensate for changing widths of objects 26 that are being powder coated. Powder coating system 30 includes one or more control units 54 which typically include computers, programmable logic controllers, or the like that control the operation of reciprocators 44, positioners 50, and guns 48. Control units 54 are illustrated diagrammatically in FIG. 2.

It will be appreciated that many different types of reciprocators, positioners, and guns may be used in powder coating system 30. For example, ITW Gema of Indianapolis, Ind. manufactures model no. ACR and ZA 1 reciprocators; a model no. XT-6 positioner, and model no. PG-2A and model no. PG-2AX guns, all of which are suitable for use in such powder coating systems 30. It is also within the scope of this disclosure for stationary guns that spray powder toward objects 26 to be included in powder coating system 30 in lieu of, or in addition to, applicators 42. Such stationary guns or nozzles can be mounted to booth 10 or to other supporting structure situated alongside booth 10. It will also be appreciated that minimizing the surface area of walls 12, 14, 16, 18 on which powder 28 can accumulate reduces the amount of time it takes to clean walls 12, 14, 16, 18 during color change operations.

Illustrative booth 10 does not include any manual powder applicator equipment. To the extent that manual powder coating operations are required for any of objects 26, it is contemplated that such manual powder coating operations be conducted in a separate spray-to-waste booth (not shown) that does not need to be cleaned during color change operations. Of course, manual powder coating equipment can be included in booth 10, if desired. Therefore, the present disclosure is not limited to booths having only automatic powder coating equipment.

Powder coating system 30 includes multiple mobile powder-recovery modules or carts 54, each of which is configured to be received in equipment-receiving space 24, as best illustrated in FIGS. 1 and 2. When it is received in equipment-receiving space 24, one of the powder-recovery carts 54 functions to recover powder 28 from the entraining air stream 29 that enters the cart 54 from interior 20. When powder coating system 30 is changed from coating objects 26 with powder 28 of a first color to coating objects 26 with powder 28 of a second color, the cart 54 received in equipment-receiving space 24 to separate powder 28 of the first color from the associated air-powder mixture 29 is moved out of equipment-receiving space 24 and another cart 54 assigned to separate powder 28 of the second color from an entraining air stream 29 is moved into equipment-receiving space 24. Thus, carts 54 are exchanged during color change operations.

Figure 4:
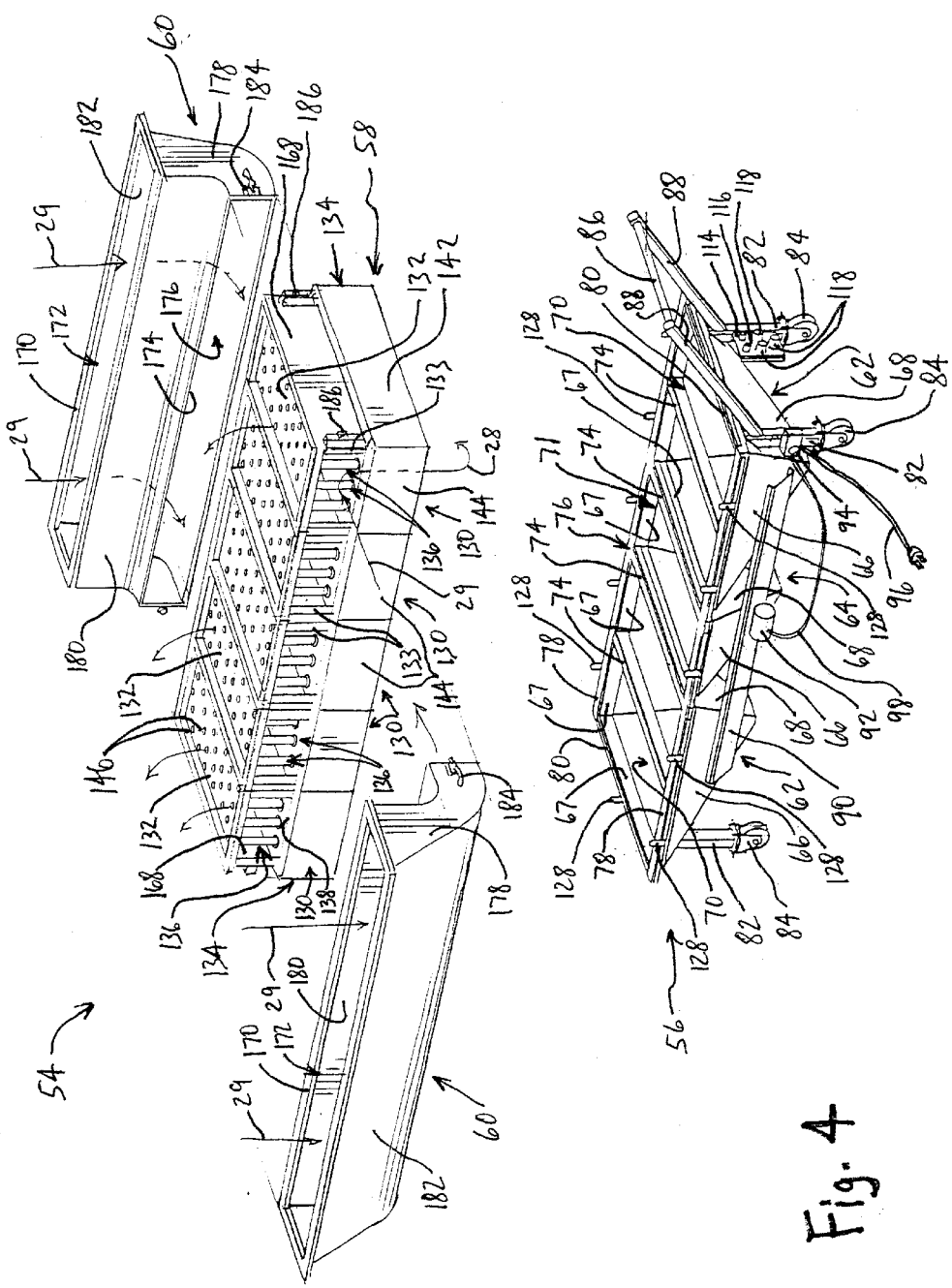
FIG. 4 illustrates a partly exploded perspective view of one of the powder-recovery carts illustrated in FIG. 1, showing a wheeled hopper assembly, a separator assembly above the hopper assembly, and first and second ducts situated along opposite sides of the separator assembly.

Turning now to the construction of carts 54, and with particular reference to FIGS. 4–11 and 14–16, each cart 54 includes a hopper assembly 56, a separator assembly 58 carried by hopper assembly 56, and 60 that couple to separator assembly 58 as illustrated, for example, in FIG. 4. Carts 54 are modular. That is, associated hopper assemblies 56, separator assemblies 58, and ducts 60 are transportable together as a unit and are movable into and out of space 24 as a unit. Therefore, the descriptions that follow of the hopper assembly 56, separator assembly 58, and ducts 60 of one illustrative cart 54 apply to other carts 54 as well, unless specifically noted otherwise.

Figure 5:
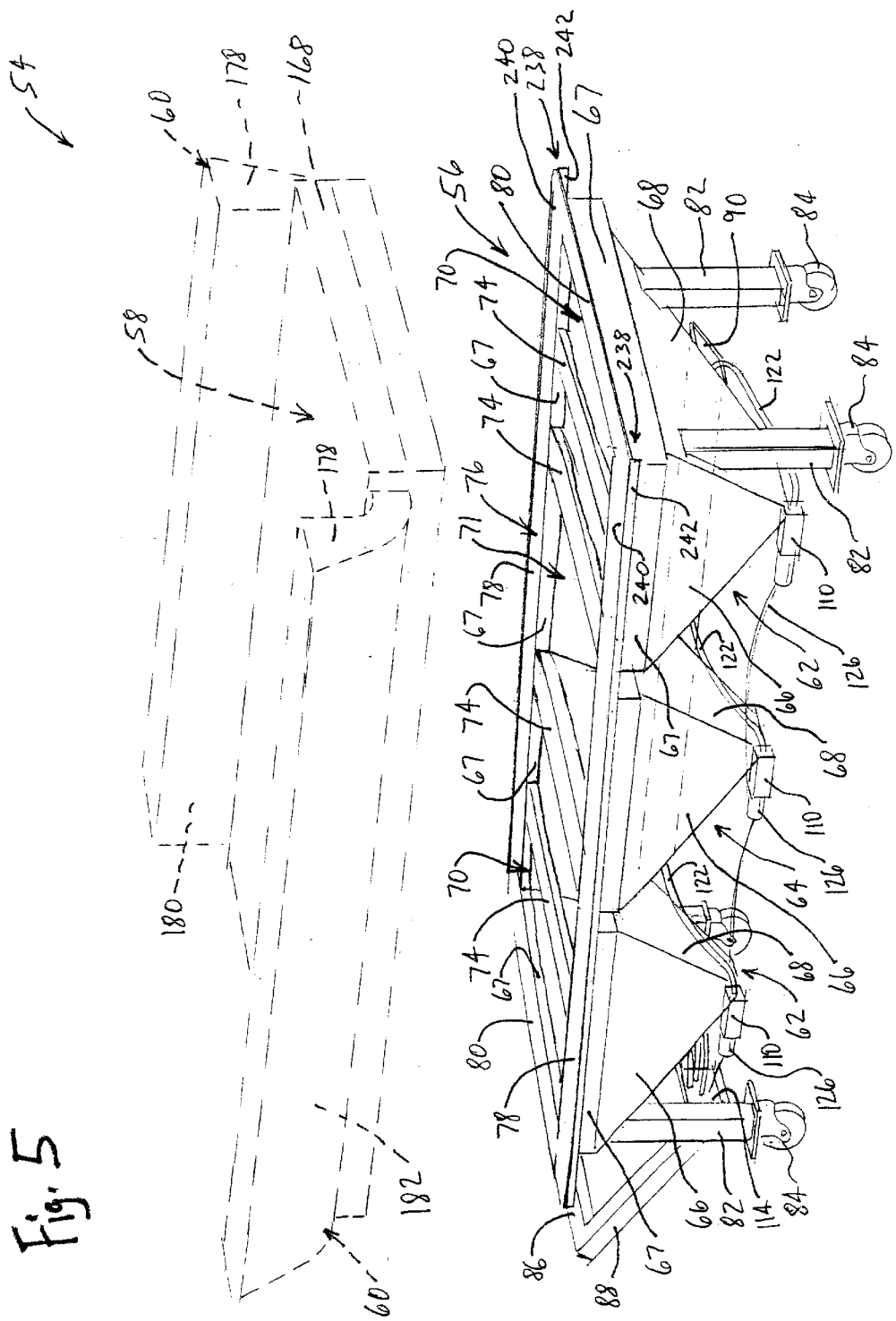
FIG. 5 illustrates a perspective view of the hopper assembly illustrated in FIG. 4, showing venturi pumps coupled to the bottoms of respective hoppers of the hopper assembly.

Illustrative hopper assembly 56 includes an upper frame 76 having a pair of longitudinally extending side frame members 78 and a pair of transversely extending end frame members 80 as illustrated in FIGS. 4 and 5. Frame members 78 cooperate with frame members 80 to define a rectangle. Frame 76 also includes four struts 74 that extend generally parallel to frame members 80 between frame members 78 struts 74 are substantially uniformly spaced between frame members 80. Illustrative hopper assembly 56 also includes large hoppers 62 and a small hopper 64 situated between hoppers 62/See FIG. 11. Hoppers 62, 64 extend downwardly from an underside of frame 76.

Hoppers 62, 64 have side walls 66 that are generally triangular in shape and end walls 68 that are generally trapezoidal in shape. Each of hoppers 62, 64 includes a generally vertical by extending upper lip 67 by which that hopper 62, 64 is mounted to frame 76. Surrounding lip 67 of each hopper 62 thus defines a somewhat square-shaped openings 70 and lip 67 of hopper 64 defines a somewhat rectangular opening 71. Hoppers 62, 64 thus define within their interiors powder-collection chambers 72, best illustrated in FIG. 11, beneath respective openings 70, 71. Two of struts 74 extend across respective openings 70 and two of struts 74 lie between respective openings 70 and opening 71 as best illustrated in FIGS. 4 and 5.

Hopper assembly 56 includes four legs 82, two of which extend downwardly from end wall 68 associated with hopper 62 at the front end of hopper assembly 56 and two of which extend downwardly from end wall 68 associated with hopper 62 at the rear end of hopper assembly 56. The lower ends of respective legs 82 are provided with casters 84 as illustrated, for example, in FIG. 4. Hopper assembly 56 also includes a handle 86 connected by arms 88 to the two of legs 82 at the front end of hopper assembly 56. Thus, powder-recovery carts 54 are made mobile and are easily movable around a powder coating facility.

Hopper assembly 56 includes a longitudinally extending channel member 90 mounted to side walls 66 of hoppers 62, 64 as best illustrated in FIG. 4. A vibrator 92, such as an eccentric motor, is mounted to member 90 and is operable to vibrate hoppers 62, 64 to facilitate movement of powder 28 collected in hoppers 28 to the bottoms of powder-collection chambers 72. A vibrator 92 controller 94 is mounted to one of legs 82 at the front end of hopper assembly 56. A power cable 96 extends from controller 94 to a power source (not shown) in a conventional manner. A control cable 98 extends between controller 94 and vibrator unit 92. Controller 94 turns vibrator unit 92 on and off and controls the frequency with which vibrator unit 92 vibrates hoppers 62, 64.

The lower ends of walls 66 of hoppers 62, 64 include openings 100 as illustrated, for example, in FIG. 11. Each cart 54 includes a set of powder transfer units 110 mounted to the bottom ends of hoppers 62, 64 as best illustrated in FIG. 5. Each powder transfer unit 110 communicates with a respective powder-collection chambers 72 through a respective associated openings 100. Illustrative powder transfer units 110 are venturi pumps. In other embodiments of cart 54, powder transfer units 110 may be any other types of devices capable of extracting the recovered powder 28 from chambers 72 and moving powder 28 back to powder station 300. Illustrative hopper assembly 56 includes a set of outlet tubes 112, illustrated in FIGS. 9 and 10, that couple respective openings 100 to respective venturi pumps 110. Venturi pumps 110 communicate with respective chambers 72 through associated tubes 112 and openings 100.

Figure 6:
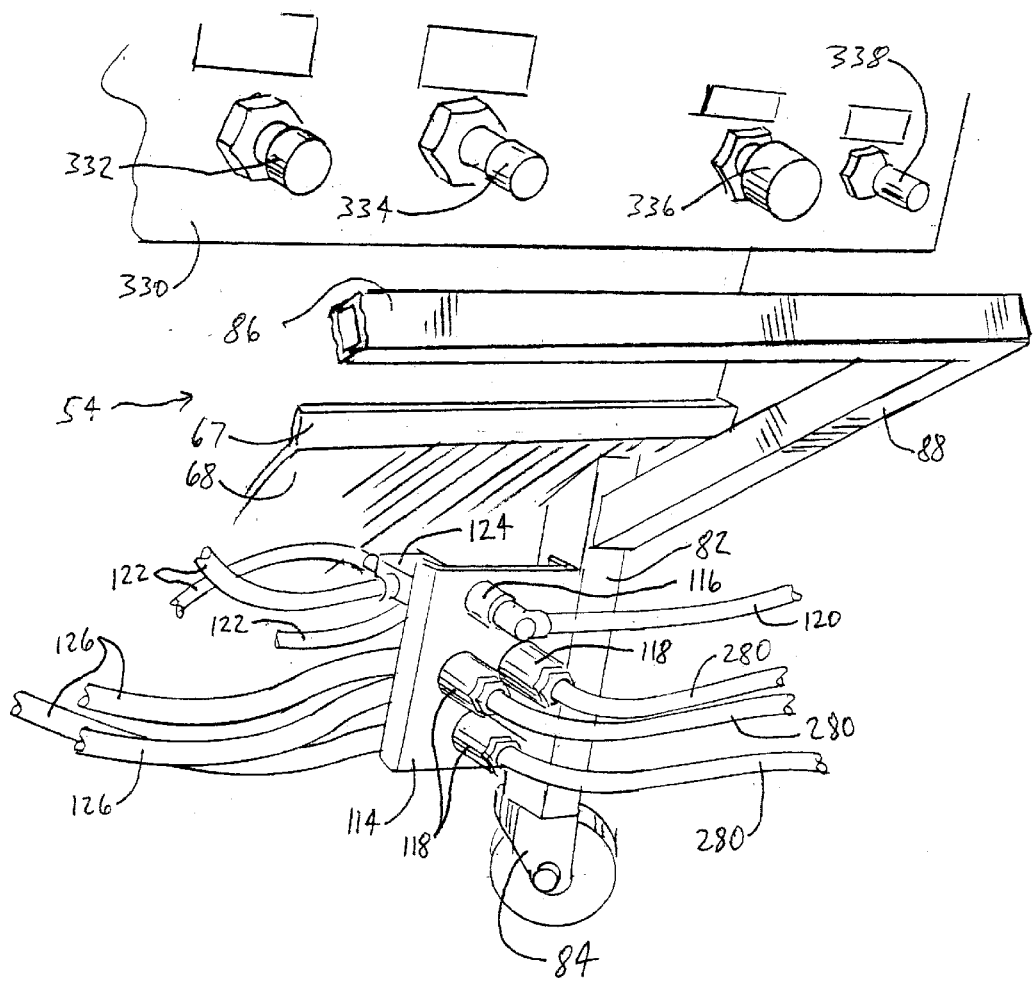
FIG. 6 illustrates a fragmentary perspective view of a detail of the booth and powder-recovery cart illustrated in FIG. 1, showing the hopper assembly including a plate to which a number of hoses are coupled and a control panel for the booth.

Hopper assembly 56 includes a manifold plate 114 mounted at a convenient location on hopper assembly 56 as illustrated best in FIG. 6. A high-pressure air inlet port 116 and powder tube ports 118 extend from plate 114 as illustrated in FIGS. 4 and 6. A high-pressure air hose 120 is coupled to port 116 to deliver high-pressure air from a pressure source (not shown) to cart 54. A three-way splitter 124 on the back side of plate 114 receives high-pressure air through port 116 and delivers high-pressure air to associated air-delivery hoses 122 which extend from splitter 124 to respective venturi pumps 110. Hopper assembly 56 also includes three powder-transfer hoses 126 that extend between outlets of associated venturi pumps 110 and respective powder tube ports 118. High-pressure air delivered to venturi pumps 110 via hoses 122 passes through venturi pumps 110 powder 28 accumulated in the bottoms of chambers 72 for transport back to powder station 300. The construction and operation of venturi pumps and dense phase conveyors is well known to those skilled in the art.

Separator assembly 58 is situated above and is carried by hopper assembly 56. Frame 76 of hopper assembly 56 has upper surfaces that are substantially coplanar with upper surfaces of struts 74 as illustrated in FIGS. 4 and 5. Separator assembly 58 rests upon the upper surfaces of frame 76 and struts 74. Hopper assembly 56 includes a plurality of tabs 128 extending upwardly from frame 76 to facilitate orienting and retention of separator assembly 58 on hopper assembly 56. Separator assembly 58 receives air-powder mixture 29 from ducts 60, separates powder 28 from air-powder mixture 29, and delivers the separated powder 28 to chambers 72 for recovery.

Figure 7:
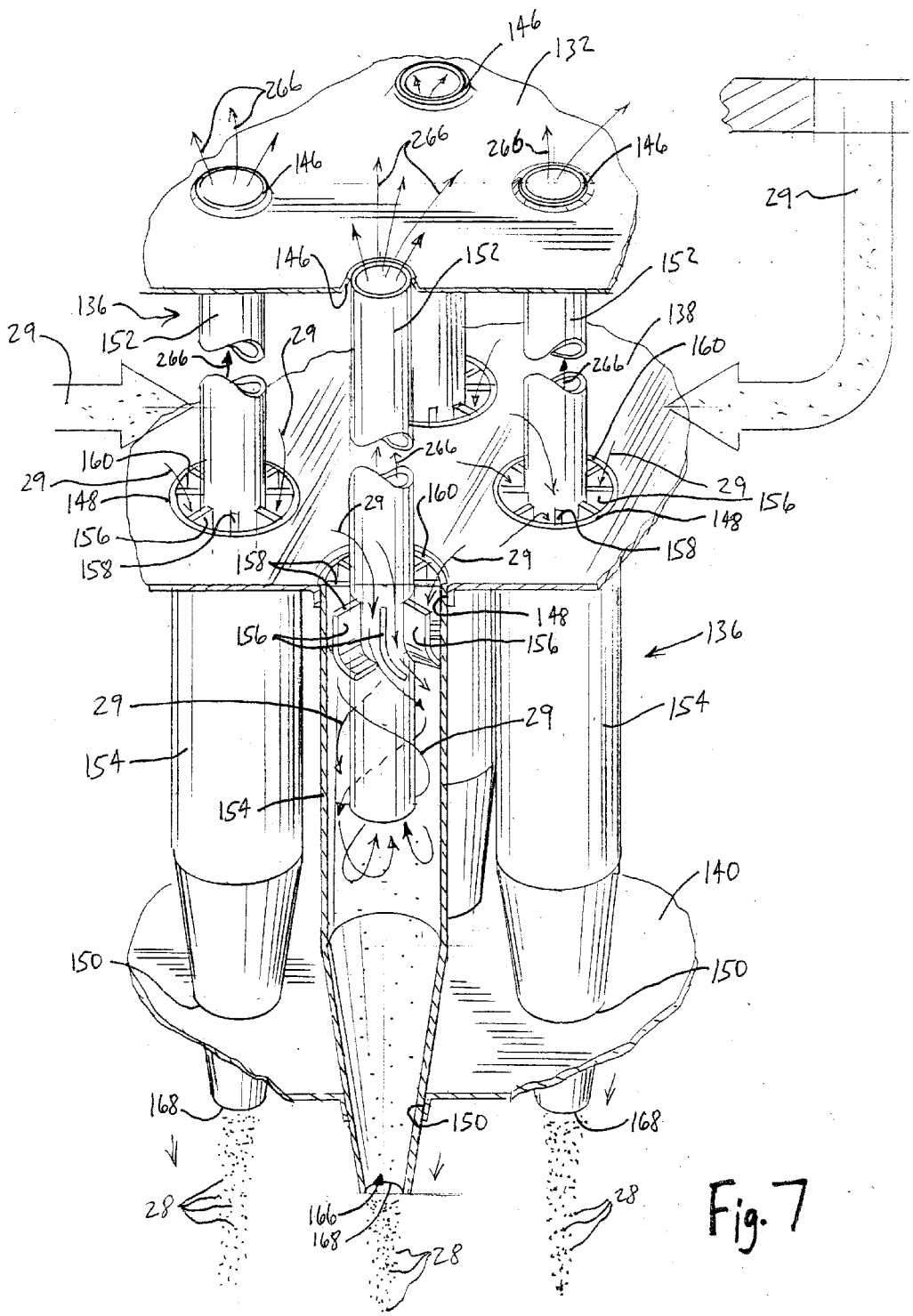
FIG. 7 illustrates an enlarged fragmentary perspective view of a detail of the separator assembly illustrated in FIG.

Illustrative separator assembly 58 includes five, side-by-side separator modules 130, as best illustrated in FIG. 4. Referring to FIGS. 4 and 7 each module 130 includes an upper panel 132, a box 134 underlying panel 132 in spaced-apart relation therewith, a plurality of supports 133 connecting panel 132 and box 134 at corners thereof, and a plurality of vertically extending separator tube assemblies 136 coupled to panel 132 and box 134. Each box 134 includes a rectangular top wall 138, a rectangular bottom wall 140, a pair of long walls 142, and a pair of short walls 144. Boxes 138 are sized so that when modules 130 are carried by hopper assembly 56, walls 142 lie above respective struts 74 or end frame members 80 and walls 144 lie above respective portions of side frame members 78.

Each panel 132 is formed to include a plurality of openings 146 and upper ends of associated tube assemblies 136, sealingly engage an underside of panel 132 in the regions around respective openings 146 as shown in FIG. 7. Top wall 138 of each box 134 is formed to include a plurality of openings 148, each of which receives a middle portion of a respective tube assembly 136, and bottom wall 140 of each box 134 is formed to include a plurality of openings 150, each of which receives a lower portion of a respective tube assembly 136. Thus, each one of openings 148 is vertically aligned with an associated opening 146 and an associated opening 150.

Each separator tube assembly 136 includes a cylindrical upper tube 152 and a lower tube 154. Each lower tube 154 includes a cylindrical upper portion and a frustoconical lower portion. The cylindrical upper portion of each lower tube 154 has a larger diameter than the associated upper tube 152 and a lower portion of each upper tube 152 is received in the cylindrical upper portion of a respective lower tube 154. Each separator tube assembly 136 further includes a plurality of deflecting vanes 156 at the upper end of lower tube 154. Vanes 156 extend radially between corresponding tubes 152, 154 and maintain tubes 152, 154 together in a coaxial configuration. Upper edges 158 of vanes 156 are substantially coplanar with an upper ends 160 of respective lower tubes 154. Vanes 156 terminate at lower edges 162 spaced from upper edges 158. Vanes 156 are configured to deflect the air-powder mixture 29 which encounters them in a somewhat spiral or helical flow which causes powder 28 from in air-powder mixture 29 to be thrown radially outwardly by centrifugal force. Thus, separator tube assemblies 136 are sometime referred to as cyclone separators. Gravity then causes the separated powder 28 to drop downwardly through the frustoconical lower portion of tubes 154 and out of openings 166 into hopper assembly 56. As powder 28 moves downwardly, the air from air-powder mixture 29 is recovered by being drawn upwardly through tubes 152 by air circulation equipment 258 as will be discussed in further detail below.

Illustrative separator assembly 58 includes five separator modules 130 that are arranged in side-by-side relation so that long walls 142 of adjacent boxes 134 confront one another. Frame members 78, 80 and struts 74 support modules 130 above powder-collection chambers 72 so that powder 28 separated from air-powder mixture 29 by separator tube assemblies 136 falls downwardly through openings 168 into the associated chamber 72. The middle separator module 130 is situated above chamber 72 defined within hopper 64. The two separator modules 130 in front of the middle separator module 130 are situated above the front hopper 62 and the two separator modules 130 to the rear of the middle separator module 130 are situated above the rear hopper 62 as illustrated in FIG. 4. Gaskets or other suitable sealing members can be interposed between bottom walls 140 of boxes 134 and the corresponding struts 74 and frame members 78, 80. Separator assembly 58 includes a pair of vertical, transversely extending end plates 168 that are situated at opposite ends of separator assembly 58 above top walls 138 of the boxes 134 of the two end modules 130 as illustrated in FIG. 4. End plates 168 are configured to close the opposite ends of the space defined between panels 132 and top walls 138 of boxes 134 of the endmost separator modules 130. In some embodiments, gaskets or other suitable sealing members are interposed between end plates 168 and modules 130.

Ducts 60 each include an upwardly facing rectangular surface 170 defining an inlet opening 172 and a vertically oriented rectangular surface 174 defining an outlet opening 176 as illustrated best in FIG. 4. Ducts 60 also each include a pair of end walls 178, a curved inner wall 180, and a curved outer wall 182. Walls 180, 182 extend longitudinally of cart 54 between walls 178. Thus, walls 178, 180, 182 of each duct 60 provide a curved passage between openings 172, 176. Separator assembly 58 includes a plurality of attachment devices, each of which includes a first portion 184 mounted to a respective end wall 178 of an associated duct 60 and a second portion 186 mounted to a respective end plate 168. Clamping assemblies 184, 186 selectively couple ducts 60 to separator assembly 58. When ducts 60 are coupled to separator assembly 58, the curved passages of ducts 60 communicate with the opposite sides of the space defined between panels 132 and top walls 138 of boxes 134 of modules 130. Gaskets (not shown) or other suitable sealing members may be provided on each of rectangular surfaces 170, 174.

Bottom wall 18 of booth 10 is formed to include a pair of elongated openings 188 as illustrated best in FIGS. 2, 3, 9, 10, 12 and 13. Interior 20 is in gas-flow communication with equipment-receiving space 24 through openings 188. When powder-recovery carts 54 are received in space 24, openings 172 of the associated ducts 60 are vertically aligned with openings 188. Each of openings 188 is bounded by a front end or edge 192, a rear end or edge 194, and a pair of longitudinal sides or edges 196 that extend between front and rear edges 192, 194. Front edges 192 of openings 188 are spaced apart from the front end of bottom wall 18 and rear edges 192 of openings 188 are spaced apart from the rear end of bottom wall 18.

Booth 10 is configured so that slot 36 formed in top wall 12 is parallel with openings 188 and over the middle region of bottom wall 18. Thus, objects 26 moving through interior 20 of booth 10 on supports 32 pass generally over the middle region of bottom wall 18. Air circulation equipment 258 operates to create a downdraft on opposite side of objects 26 so that a significant amount of the nonadherent powder 28 in booth 10 is swept away downwardly through openings 188, ducts 60, and into hoppers 62, 64.

Referring now to FIGS. 1, 3 and 8–13 frame 22 of booth 10 includes a pair of rectangular lower frame portions 198 each having a pair of side frame members 200 and a front frame member 210 as shown in FIG. 1. Frame 22 further includes a rear frame member 212 coupled to the rear ends of side frame members 200. A middle portion of rear frame member 212 bridges the space between frame portion 198 as illustrated in FIG. 8. Frame 22 also includes vertical frame members 214, each of which extends upwardly from an outside corner of each frame portion 198 to support walls 12, 14, 16, 18. Leveling pads 216 are provided on frame portions 198 at appropriate locations to level booth 10. Equipment receiving space 24 is defined between frame portions 198 at the front of booth 10.

Booth 10 includes actuators 220 mounted by brackets 222 to associated side frame members 200 as illustrated in FIG. 8. Booth 10 further includes a pair of lift rails 224 mounted on respective pairs of actuators 220. In the illustrative embodiment, actuators 220 are pneumatic piston-and-cylinder actuators which are supplied with compressed gas and vented through pneumatic lines 230, as is well-known to those skilled in the art. It will be appreciated that other types of actuators 220, including electrically powered actuators, hydraulic actuators, motors, and other electromechanical devices in combination with transmission elements or linkages, may be used. Each lift rail 224 includes a vertical first side surface 234 facing toward the equipment-receiving space 24, a vertical second side surface 235 facing away from the center region of equipment receiving space 24, and a guiding surface 236 that angles outwardly from surface 234 toward the front of booth 10. Side frame members 78 of hopper assembly 56 are each formed to include a catch lip 238 that extends longitudinally of frame 76. Each catch lip includes a top portion 240 extending laterally outwardly from frame 76 and a side portion 242 extending downwardly from the respective top portion 240.

As powder-recovery cart 54 initially moves into equipment-receiving space 24 in the direction of arrow 243, FIG. 8, guiding surfaces 236 help to guide cart 54 into proper alignment with booth 10. As cart 54 moves further into space 24 in direction 243, catch lips 238 move over respective lift rails 224. Legs 82 at the rear end of cart 54 engage the middle portion of rear frame member 212 upon full insertion of cart 54 into space 24. When cart 54 is fully inserted into space 24, openings 172 of ducts 60 are vertically aligned underneath openings 188 in bottom wall 18.

Referring to FIGS. 3 and 9–12 booth 10 includes an air plenum or duct 244 coupled to an underside of the middle region of bottom wall 18 between openings 188. Air plenum 244 has a planar bottom surface 246. Air plenum 244 has a large opening formed in bottom surface 246 and separator assembly 58 is situated beneath this large opening when cart 54 is inserted fully into space 24. Air plenum 244 further includes an inclined front panel 248 and a rectangular-to-round transition duct section 250. Inclined panel 248 is configured to provide a uniformly increasing cross sectional duct area toward duct section 250, thereby promoting laminar flow of air from the cart 54 as the air moves into and through plenum 244.

After cart 54 is fully inserted into space 24 underneath bottom wall 18 of booth 10, actuators 220 are actuated to lift cart 54 upwardly into sealing engagement with booth 10. As actuators 220 move from the retracted positions to the extended positions, lift surfaces 232 of respective lift rails 224 come into contact with top portions 240 of respective catch lips 238 to lift cart 54 upwardly from a lowered position, illustrated in FIG. 9, to a raised position, illustrated in FIGS. 10 and 11.

Initially, before a cart 54 is lifted into orientation to be connected to booth 10 to recover powder, rectangular surfaces 170 of ducts 60 are spaced apart from bottom wall 18 by a small distance 252 (FIG. 9) and top walls 138 of separator modules 130 are spaced apart from bottom surface 246 of air duct 244 by a small distance 254. In some embodiments, distance 252 may be substantially the same as to distance 254 so that, as actuators 220 raise cart 54, sealing engagement of ducts 60 with bottom wall 18 and sealing engagement of separator assembly 56 with surface 246 of air plenum 244 occurs simultaneously. In other embodiments, gaskets having different thicknesses may be interposed between ducts 60 and bottom wall 18 on the one hand and between air duct 244 and separator assembly 56 on the other hand, and distances 252, 254 need not be substantially equivalent. In such embodiments, as actuators 220 raise cart 54, sealing engagement between ducts 60 and bottom wall 18 may occur either before or after sealing engagement between air duct 244 and separator assembly 56 depending upon differences in the thicknesses of the gaskets or sealing members used. Thus, interposing gaskets or other suitable sealing members between booth 10 and cart 54 permits distances 252, 254 to be different.

After cart 54 is lifted upwardly into engagement with booth 10, casters 84 are spaced above the floor by a distance 256 (FIGS. 10 and 11). Distance 256 is substantially the same as whichever of distances 252, 254 is smaller, because once cart 54 moves upwardly by an amount sufficient to close the smaller one of distances 252, 254, cart 54 is unable to move upwardly any further to close the larger of distances 254. Of course, if distances 252, 254 are substantially equal, then distance 256 will also be substantially equal to distances 252, 254.

Various gaskets or sealing members are typically interposed between certain elements of cart 54 and between certain portions of cart 54 and booth 10. In embodiments having such gaskets or sealing members, these may be constructed from urethane, such as microcellular urethane, or a similar material having appropriate resiliency and sealing properties. In addition, the gaskets or sealing members may include pressure sensitive adhesives on their contact surfaces. In such embodiments, the pressure sensitive adhesive enables the gasket to which it is applied to be adhered to the associated portion of booth 10 or cart 54.

Figure 3:
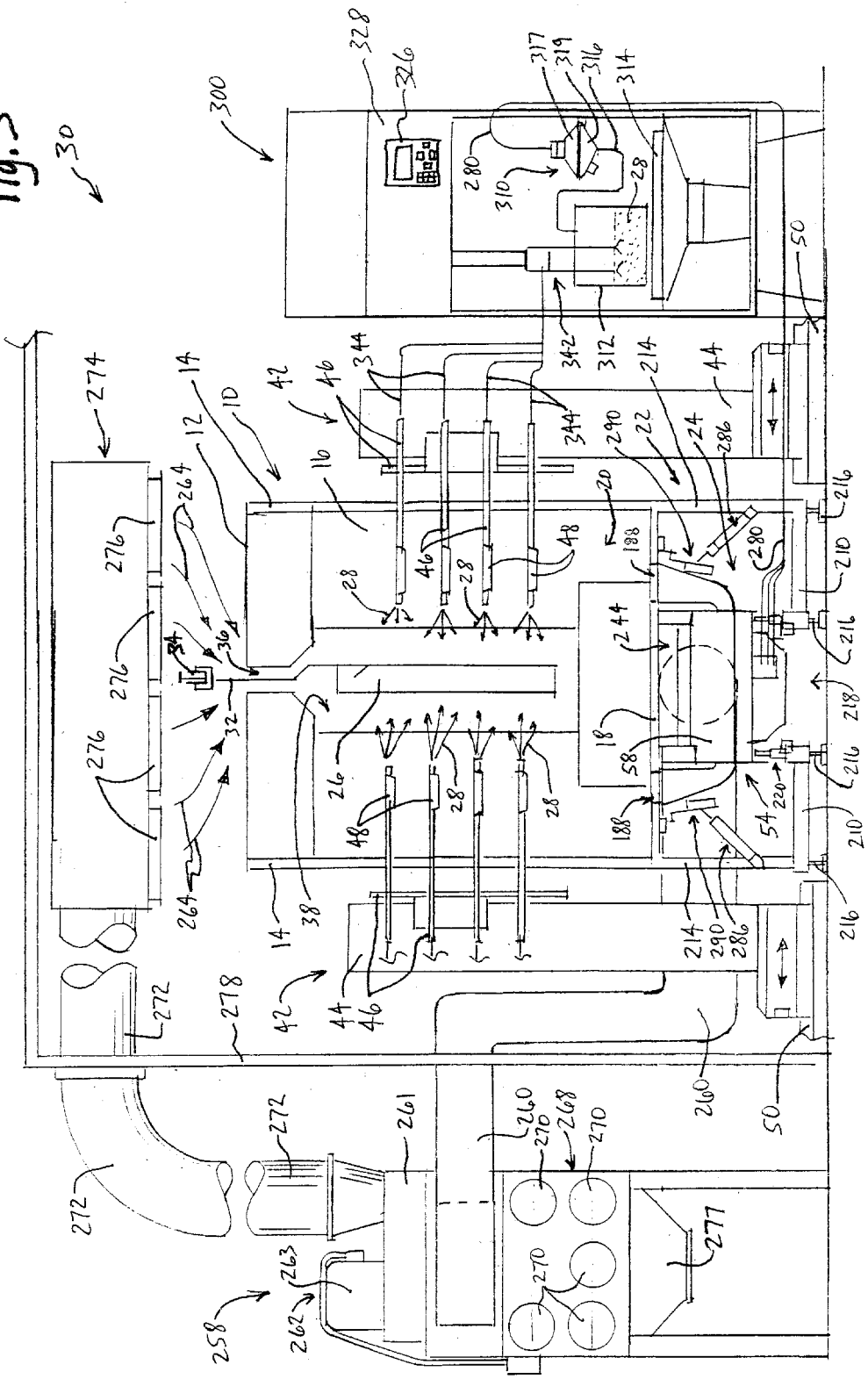
FIG. 3 illustrates a partly fragmentary front elevation view of a portion of the powder coating system illustrated in FIGS. 1–2, showing the booth, a powder station to the right of the booth, and air circulation equipment to the left of the booth.

Powder coating system 30 includes air circulation equipment 258 that is coupled to air plenum 244 of booth 10 by duct work 260 as illustrated in FIGS. 2 and 3. Air circulation equipment 258 includes a housing 261 and a fan 262 having a motor 263 at the top of housing 261. Fan 262 is turned by motor 261 to draw air into and through inner space 20 of booth 10, into and through separator assembly 58 of powder-recovery cart 54, into and through air plenum 244 of booth 10, and into and through duct work 260. Air indicated by arrows 264 being drawn into inner space 20 of booth 10 moves from outside of booth 10 and through slot 36 and openings 38 as illustrated in FIG. 3.

As air 264 moves through inner space 20 of booth 10, powder 28 exiting from guns 48 which does not adhere to articles 26 becomes entrained in air 264 to form air-powder mixture 29. Air-powder mixture 29 is drawn by air circulation equipment 258 through openings 188 of bottom wall 18 and through openings 172 into ducts 60 and then through openings 176 into the space defined between panels 132 and boxes 134 of separator modules 130. As described above with regard to FIG. 7, air-powder mixture 29 moves through openings 148 formed in top walls 138 of boxes 134 into separator tube assemblies 136 where powder 28 is separated from air-powder mixture 29 and is fed downwardly to hopper assembly 56 for recovery. Air from the air-powder mixture 29 that enters separator tube assemblies 136 moves upwardly through tubes 152 as indicated by arrows 266 in FIGS. 7 and 11 after powder 28 is separated therefrom.

Air circulation equipment 258 draws air 266 from air-powder mixture 29 upwardly through tubes 152 and into air plenum 244 through openings 146 formed in panels 132 of separator modules 130. It will be appreciated that, while separator tube assemblies 136 are configured to separate a significant amount of powder 28 from air-powder mixture 29, a small percentage of powder 28 from air-powder mixture 29 may still be entrained in the air 266 that moves upwardly from tubes 154 into air plenum 244. Thus, the air 266 moving upwardly through tubes 154 of separator tube assemblies 136 and into air plenum 244 is generally, but not completely, powder-free.

Air circulation equipment 258 draws air 266 through air plenum 244 and into duct work 260. Once air 266 reaches air circulation equipment 258, air passes through a filter section 268 of air circulation equipment 258. Filter section 268 has a set of filters 270 that, in some embodiments, are high-efficiency cartridge filters, such as HEPA filters, capable of filtering 0.5 micron particles at 99.999% efficiency. Air circulation equipment 258 includes a cleaning system that, from time to time, directs blasts of high pressure air at filters 270 to dislodge the powder 28 that accumulates in filters 270. For example, in one embodiment, each high-pressure air blast is about 0.1 seconds in duration. The cleaning air blasts occur about every 15 seconds during the operation of fan 262. The dislodged powder 28 falls downwardly to a waste hopper 277 of air circulation equipment 258 for collection and disposal.

After air 266 is filtered by filters 270 in filter section 268, fan 262 discharges the filtered air into a return duct 272 and moves the filtered air to a final filter section 274. Final filter section 274 includes a plurality of filters 276 that, in some embodiments, are able to filter 0.5 micron particles at 95% efficiency. Even though filters 270 in filter section 268 have very high efficiency, over a long period of time, the efficiency of filters 270 may decrease such that some powder 28 may find its way past filters 270. In addition, if any filter 270 has a compromised seal or a rupture, then powder 28 entrained in the air will pass through filters 270. Thus, filters 276 in final filter section 274 are configured to capture most of any powder 28 passing through filters 270 prior to discharge of the air back into the ambient environment.

As illustrated diagrammatically in FIG. 3, air circulation equipment 258 can be positioned on one side of a wall 278 of a manufacturing facility and many of the other pieces of equipment of powder recovery system 30, such as booth 10 and carts 54, are positioned on the other side of wall 278. Wall 278 can provide a barrier to same of the noise generated by fan 262 and the cleaning system of air circulation equipment 258 from reaching the area of the manufacturing facility in which booth 10 resides.

Fan 262 normally operates to move a sufficient volume of air at a sufficient rate into booth 10 to prevent powder 28 sprayed from guns 48 from exiting booth 10 through slot 36 and openings 38. In addition, illustrative separator tube assemblies 136 operate at high efficiencies to separate powder 28 from air-powder mixture 29. In an illustrative system the volume flow rate of air-powder mixture 29 drawn into each separator tube assembly 136 is in the range of about 17 cubic feet per minute to about 21 cubic feet per minute. Illustrative separator modules 130, each having 76 separator tube assemblies 136, separate a high percentage of powder 28 from air-powder mixture 29 if about 1500 cubic feet of air per minute is drawn through each module 130. Thus, in the illustrative embodiment in which carts 54 each have five separator modules 130, fan 262 is selected to move about 7500 cubic feet of air per minute through booth 10 and cart 54. This air flow rate contains the powder 28 sprayed from guns 48 in booth 10 and also separator modules 130 to have efficiencies consistently greater than 95%.

Air circulation equipment 258 includes a number of gages, pressure switches and sensors (not shown) to sense air velocities and pressures at various points in the air flow passages of air circulation equipment 258. Depending upon the velocities and pressures sensed, the speed at which motor 263 of fan 262 operates can be adjusted to maintain the appropriate volume flow rates of air flow throughout powder coating system 30. In addition, if certain sensors sense that the pressure drop across, for example, filters 270 or filters 276 exceeds a certain amount, a warning indicator, such as a light or an image on a display screen, may be activated to indicate that filters 270 or filters 276, as the case may be, will soon need to be replaced. If the sensors sense that the pressure drop across filters 270 or filters 276 is too great, which indicates a heightened risk that powder containment in booth 10 may be lost, then a signal can be sent to shut down powder coating system 30 altogether. If powder coating system 30 is shut down in this manner, the reason for the shutdown can also be displayed on a display screen.

Powder 28 that is separated from air-powder mixture 29 by separator assembly 58 and that accumulates in the bottom of chambers 72 of hoppers 62, 64 is moved by powder transfer units 110, such as illustrative venturi pumps 110, back to powder station 300 as described above. Illustrative powder coating system 30 includes a set of hoses 280 that extend between cart 54 and powder station 300 as shown in FIG. 3. First ends of each of hoses 280 are coupled to ports 118 extending from plate 114 of the cart 54 situated in space 24. Powder station 300 includes a sieve 310, illustrated in FIGS. 3 and 16–18. Second ends of hoses 280 are coupled to sieve 310. Each of hoses 126 extending from illustrative venturi pumps 110 communicates with a respective hose 280 through an associated port 118.

Referring now to FIGS. 16–18, during a coating operation a container 312 of powder 28 rests upon a shelf 314 of powder station 300. Powder station 300 includes a hose 316 that extends from the bottom of sieve 310. An open, distal end of hose 316 is placed in container 312. Powder 28 that accumulates in chambers 72 of hoppers 62, 64 is moved by powder transfer units 110 through hoses 126, through ports 118, through hoses 280, through sieve 310, through hose 316 and is returned to container 312. Sieve 310 includes a frustoconical upper portion 317, a frustoconical lower portion 319, a filter screen 318 that is interposed between portions 317, 319 as shown in FIG. 18, and a band 321 that couples portions 317, 319 together as shown in FIGS. 16 and 17. Filter screen 318 is configured to permit particles of powder 28 to pass therethrough while blocking any foreign contaminants that are larger than the screen mesh to prevent them from reaching container 312. Recovered powder 28 is then recycled back through powder applicators 42 to coat objects 26.

As described previously, when powder coating system 30 is changed over from coating objects 26 with powder 28 of a first color to coating objects 26 with powder 28 of a second color, the cart 54 situated in equipment-receiving space 24 during powder coating operations with the powder 28 of the first color (hereinafter "first cart 54") is removed from space 24 and a new cart 54 (hereinafter "second cart 54") is moved into space 24. Prior to removal of first cart 54 from space 24, guns 48 of powder applicators 42 are turned off to permit one or more operators to perform certain cleaning operations as described below. In addition, conveyor 34 is operated to clear objects 26 out of booth 10.

After guns 48 are turned off so that no more powder 28 is being sprayed into booth 10, an operator uses a squeegee, dry mop, broom, or other similar device (not shown) to clear bottom wall 18 of loose powder 28 by sweeping powder 28 from bottom wall 18 into openings 188. During this initial cleaning operation, air circulation equipment 258 continues to operate so that the powder swept through openings 188 into the powder-recovery cart 54 thereunder is recovered. In addition, the operator sweeping the powder 28 on bottom wall 18 into openings 188 inserts the squeegee, broom, etc. into inner space 20 of booth 10 through the opening 38 at the front of booth 10 while standing on the floor in front of booth 10. After bottom wall 18 is cleared of loose powder 28, air circulation equipment 258 is turned off and first cart 54 is removed from space 24.

To remove first cart 54 from equipment-receiving space 24, actuators 220 are moved from the extended positions to the retracted positions so that first cart 54 is moved from the raised position, illustrated in FIGS. 10 and 11, to the lowered position, illustrated in FIG. 9. After first cart 54 is moved to the lowered position, hoses 120, 280 are disconnected from respective ports 116, 118, power cable 96 is disconnected from the power source, and first cart 54 is wheeled out of space 24 for cleaning. First cart 54 can be disassembled so that ducts 60, separator modules 130, and hopper assembly 56 can be cleaned separately. Portions of clamping devices 184, 186 are manipulated to permit disconnection of ducts 60 from separator assembly 58. After ducts 60 are disconnected, separator modules 130 can be lifted off of hopper assembly 56. Any powder 28 on ducts 60, separator modules 130, and hopper assembly 58 can be cleaned using various cleaning devices, including high pressure air guns, vacuum cleaners, and manual cleaning devices, such as cloths, brooms, mops, and the like.

Booth 10 includes a pair of doors 290, each of which is supported with respect to bottom wall 18 for movement between a first position closing a respective opening 188, as illustrated in FIG. 13, and a second position away from the respective opening 188, as illustrated in FIG. 12. Booth 10 includes longitudinally extending frame members 294 and hinges 292. Each hinge 292 includes a first hinge half 293 coupled to bottom wall 18 by a respective frame member 294 and a second hinge half 295 coupled to a respective door 290. Each hinge half 295 is pinned to an associated hinge half 293 for pivoting movement about a corresponding longitudinally extending pivot axis 296. Pivot axes 296 are parallel with the longitudinal dimensions of respective openings 188.

Booth 10 further includes actuators 286 that operate to move doors 290 between the first and second positions. In the illustrative embodiment, actuators 286 are pneumatic actuators, each having a cylindrical housing 285 and a piston that projects and retracts a rod 287 out of and into the associated housing 285 in a conventional manner when air is supplied to or exhausted from the housing 285. Each actuator 286 is pivotably coupled between a member 288 of frame 22 and an associated door 290. Movement of actuators 286 between extended positions and retracted positions moves the respective doors 290 between the first and second positions.

It will be appreciated that other types of actuators, including electrically powered linear actuators, hydraulic actuators, motors, and other electromechanical devices in combination with transmission elements or linkages, may be used in lieu of pneumatic actuators. Thus, the term "actuator" or "actuators" as used in the specification and in the claims is intended to cover all of these types of actuators, as well as the equivalents thereof unless otherwise specified.

Each door 290 includes a fillet 289 having an upper surface 291. In addition, each door 290 includes a portion 298 that offsets fillet 289 away from hinge half 295 so that, when doors 290 move to the respective second positions, fillets 289 move downwardly and outwardly away form the central region of space 24 by a sufficient amount to accommodate receipt of ducts 60 beneath openings 188. Fillets 289 are received in respective openings 188, with the result that surfaces 291 of fillets 289 are substantially coplanar with the upper surface of bottom wall 18 when doors 290 are in the first positions as illustrated in FIG. 13. When doors 290 are in the first positions, fillets 289 fill almost all of the space bounded by edges 192, 194, 196 which define respective openings 188. Sufficient clearance exists between fillets 289 and edges 192, 194, 196 to facilitate the movement of doors 290 into their first positions.

After first cart 54 is removed from space 24 and doors 290 are moved to the first positions to close openings 188, the operator enters booth 10 through opening 38 at the rear of booth 10. Because walls 12, 14, 16, 18 of booth 10 are elevated above the floor by frame 22, a set of stairs 282 and a landing 284 at the top of stairs 282 are provided at the rear of booth 10 to facilitate the operator's entry into inner space 20 of booth 10. Stairs 282 and landing 284 are illustrated in FIG. 2. After the operator enters inner space 20 of booth 10, doors 40 are moved to the closed positions and the operator cleans the surfaces of walls 12, 14, 16, 18 and doors 40 that face toward inner space 20 by vacuuming, mopping and the like. As illustrated in FIG. 13, receipt of fillets 289 in openings 188 levels the bottom wall 18 when doors 290 are moved to their closed positions.

Booth 10 includes a control panel 330, best illustrated in FIGS. 6, 14 and 15, at the front end of booth 10 and a sensor 320, best illustrated in FIGS. 14 and 15, coupled to a frame member 322 behind control panel 330. Control panel 330 includes a first switch 332 that controls the extension and retraction of actuators 220, a second switch 334 that controls the extension and retraction of actuators 286, and a pressure regulator 336 that controls delivery of high pressure air through hose 120, port 116, splitter 124, and hoses 122 to venturi pumps 110. A high-pressure air port 338 is also provided on control panel 330 as a connection point for various devices, such as high-pressure air guns (not shown), that require high pressure air for operation.

Pushing switch 332, moves actuators 220 to extended positions to raise lift rails 224. Pulling switch 332 outwardly moves actuators 220 to retracted positions to lower lift rails 224. When no cart 54 is present in space 54, pushing switch 334 inwardly moves actuators 286 to extended positions to raise doors 290 to the first positions to close openings 188. Pulling switch 336 outwardly moves actuators 286 to retracted positions to move doors 290 away from openings 188. Adjusting pressure regulator 336 changes the pressure of air supplied to venturi pumps 110 through hose 120, port 116, splitter 124, and hoses 122. Control panel 330 includes a gauge 340 that provides a booth operator with a visual indication of the pressure being supplied to venturi pumps 110.

Sensor 320 senses the presence of a cart 54 in space 24. In the illustrative embodiment, sensor 320 has a lever 324 that is biased to a substantially vertical orientation extending into equipment-receiving space 24, as illustrated in FIG. 14. When a cart 54 is moved into space 24, the cart 54 engages lever 324 moving it away from the vertical orientation, as illustrated in FIG. 15. When a cart 54 moves lever 324 in this manner, a signal is provided to controller circuitry of booth 10 that prevents movement of doors 290 from the second positions to the first positions. Thus, if switch 334 is pushed when a cart 54 is in space 24, actuators 286 will not move from the retracted positions to the extended positions.

After the operator finishes cleaning doors 40 and walls 12, 14, 16, 18 in inner space 20 of booth 10, doors 40 are opened and the operator exits booth 10. Then, after the operator exits booth 10 and before second cart 54 is moved into space 24, switch 334 is pressed to move doors 290 from the first positions to the second positions. Once doors 290 are moved to the second positions, second cart 54 is pushed into space 24. Switch 332 is pressed to raise second cart 54 into sealing engagement with booth 10. Hoses 120, 280 are connected to respective ports 116, 118 of second cart 54, either before or after second cart 54 is raised by actuators 220.

Various portions of powder station 300 and powder applicators 42 are cleaned when powder coating system 30 undergoes a color change. A second operator may attend to the cleaning of powder station 300 and powder applicators 42 while the first operator cleans booth 10 and exchanges carts 54. Illustrative powder coating system 30 is designed to permit two operators to complete the color change process in 15 minutes or less.

In the illustrative embodiment, many of the cleaning operations of powder station 300 and powder applicators 42 are done under automatic control and therefore, the worker attending to the cleaning of these pieces of powder-delivery equipment 42, 300 does so, in large part, by entering various cleaning commands via a user input device, such as a computer keyboard or a touch-screen display. For example, such a user input device 326 coupled to an upper portion of a housing 328 of powder station 300 is illustrated diagrammatically in FIG. 3. When the operator selects a cleaning mode by entering inputs on device 326, powder delivery to guns 48 is stopped and the components of guns 48 that cause powder 28 to be electrostatically charged are turned off. Reciprocators 44 and positioners 50 automatically move to cleaning positions. A number of high-pressure air nozzles (not shown) are coupled to booth 10 in the vicinity of vertical slots 52. Positioners 50 move guns 48 cyclically in and out under automatic control while high-pressure air exits the high pressure air nozzles to blow off any powder 28 accumulated on the external surfaces of guns 48. Additional details of such high pressure air nozzles that clean guns 48 can be found in U.S. Pat. No. 5,759,271, which is incorporated by reference herein.

Returning again particularly to FIGS. 16–18, powder station 300 includes an assembly 342 of tubes 346 and a plurality of suction hoses 344 that extend between the upper ends of tubes 346 and respective guns 48. Tubes 346 that are provided in two groups mounted on respective stabilizing bars 348 as illustrated in FIGS. 17 and 18. Tube assembly 342 further includes a lift bracket 350 coupled to the upper ends of tubes 346.

Powder station 300 includes a guide 352 and a lift assembly 354. Lift assembly 354 includes a pair of lift actuators 356 including cylinders 358 coupled to guide 352 and rods 360 that extend and retract relative to cylinders 358. Lift assembly 354 further includes a slider 362 coupled to upper ends of rods 360. Bracket 350 is coupled to slider 362 by flange 364. Slider 362 moves upwardly on guide structure 352 when rods 360 are extended out of cylinders 358 and slider 362 moves downwardly on guide structure 352 when rods 360 are retracted into cylinders 358. Flange 364, bracket 350, tubes 346, and bars 348 move with slider 362 as slider moves upwardly and downwardly.

During powder coating operations, the lower ends of tubes 342 are lowered into the mass of powder 28 contained in container 312 and suction is applied to tubes 342 and hoses 344 to extract powder 28 out of container 312 and deliver the extracted powder 28 to guns 48. During a color change operation, an operator enters a command on input device 326 to lift tube assembly 342 upwardly out of container 312 as indicated by arrow 366 in FIG. 17. After tube assembly 342 is lifted out of container 312, container 312 is removed from shelf 314. The operator removes the bottom end of hose 316 from container 312, and then removes container 312 from shelf 314.

Powder coating station 300 includes a plurality of high-pressure air nozzles 368, each of which is aligned with an opening in a corresponding tube 346 as illustrated in FIG. 17. Nozzles 368 are provided openings 369 formed in shelf 314. The ends of nozzles 368 are either substantially coplanar with or slightly below shelf 314. After container 312 is removed from shelf 314, the operator enters a command on input device 326 to lower tube assembly 342 downwardly from a raised position, illustrated in FIG. 17, to a lowered position, illustrated in FIG. 18. When tube assembly 342 is in the lowered position, each nozzle 368 registers with opening in respective tube 346. Then, high-pressure air is supplied through nozzles 368 to clean powder 28 from the internal passages of tubes 346, hoses 344, and guns 48. After a time, the high-pressure air is turned off and tube assembly 342 is lifted from nozzles 368 to the raised position illustrated in FIG. 17.

While tubes 346, hoses 344, and guns 48 are being cleaned, the operator can disassemble sieve 310 and clean filter screen 318 and portions 317, 319 using, for example, a high-pressure air gun 367, illustrated in FIG. 18. If desired, after disconnection of hoses 280 from ports 118 of a cart 54 and before removal of the end of hose 316 from container 312, the operator may insert air gun 367 into the ends of the hoses 280 disconnected from ports 118 and direct high-pressure air through hoses 280 to blow any powder 28 remaining in hoses 280 through sieve 310 and into container 312. Alternatively, the operator may replace hoses 280 with clean ones during color change operations and forego using air gun 367 to clean the hoses 280 being replaced. The operator cleaning powder station 300 may also will use a cloth or the like to wipe down external surfaces of the various pieces of equipment, such as sieve 310, tube assembly, and lift assembly 354.

After powder station 300 is cleaned, a replacement container 312 that contains powder of a different color is placed on shelf 314 and the operator enters a command on input device 326 to lower tube assembly 342 into the replacement container 312. Then, once the operator cleaning powder station 300 confirms that no one is in booth 10 and that booth 10 and second cart 54 are ready for powder coating operations, the operator enters commands on input device 326 to resume the powder coating operations.

Powder coating system 30 includes at least one spray-to-waste equipment module or cart 370 as illustrated in FIGS. 1 and 2. Cart 370 is placed in equipment-receiving space 24 when no powder 28 is to be recovered for reuse during powder coating operations. Cart 370 is similar to carts 54 and therefore, like reference numerals are used to denote components of cart 370 that are substantially the same as like components of carts 54. The main difference between cart 370 and carts 54 is that cart 370 does not include any separators or hoppers.

Cart 370 includes a rectangular bottom panel 372 and a pair of end panels 374 extending upwardly from bottom panel 372. Cart 370 further includes a pair of frame members 376 extending longitudinally between the upper corners of end panels 374 and a set of vertical frame members 378 extending between frame members 376 and bottom panel 372 for stability. Ducts 60 are coupled to end panels 374 with clamping devices that are the same as the clamping devices used in carts 54 to couple ducts 60 to separator assembly 58. Cart 370 is configured so that an empty space 380 is defined above bottom panel 372 between end panels 374. The inner passages of ducts 60 are in fluid-flow communication with empty space 380 through openings defined beneath frame members 376 and between frame members 378.

When cart 370 is received in space 24 and lifted to a raised position by actuators 220, empty space 380 is in fluid-flow communication with air plenum 244. In some embodiments, gaskets or sealing members are interposed between bottom surface 246 of air plenum 244 and the upper surfaces of frame members 376 and end panels 374 of cart 370.

When spray-to-waste cart 370 is received in space 24, the air powder mixture 29 is drawn by fan 262 through openings 188 formed in bottom wall 18 of booth 10, through ducts 60, through empty space 380 of cart 370, through duct work 260, and into housing 261. After air-powder mixture 29 reaches housing 261, fans 262 draw air-powder mixture 29 through filters 270 of filter section 274 so that powder 28 is filtered out of air-powder mixture 29. The powder 28 filtered out of air-powder mixture 29 is blown downwardly to waste hopper 277 by the cleaning system of air circulation equipment 258 for collection and disposal. When cart 370 is received in space 24, air circulation equipment 258 can be operated to draw air through booth 10, cart 370, air plenum 244, and ductwork 260 at a higher flow rate than when any of carts 54 are received in space 24.

Although the invention has been described in detail with reference to certain preferred embodiments, variations and modifications exist within the scope and spirit of the invention as described and defined in the following claims.

What is claimed is:

1. A booth for a powder coating system that operates to dispense powder onto objects to be coated by the powder, the booth including booth walls defining a first space in which objects are powder coated, one of the booth walls being a bottom wall of the first space, the bottom wall being formed to include first openings, a second space being defined beneath the bottom wall, the second space communicating with the first space through the first openings, the second space being adapted to receive a powder-recovery module placed beneath the bottom wall for recovery through the first openings of powder which does not adhere to the objects, doors supported with respect to the bottom wall and movable between first positions closing the first openings and second positions not closing the openings, and actuators coupled to the doors and operable to move the doors between the first positions and the second positions.

2. The booth of claim 1 further including actuators adapted to lift the powder-recovery module toward the bottom wall.

3. The booth of claim 2 further including a frame coupled to the booth walls, and the actuators being coupled to the frame.

4. The booth of claim 2 further including a lift coupled to the actuator for engaging and lifting the powder-recovery module when the actuators are actuated.

5. The booth of claim 1 further including a frame coupled to the booth walls, the actuators being coupled to the frame.

6. The booth of claim 1 wherein the doors are coupled to the bottom wall.

7. The booth of claim 1 wherein the doors are coupled to the bottom wall by the hinges and pivot about respective hinge axes between the first positions and the second positions.

8. The booth of claim 7 wherein the axes are beneath the bottom wall.

9. The booth of claim 7 wherein each first opening is elongated slot-like, and the axes are parallel to longitudinal dimensions of the respective first openings.

10. The booth of claim 1 further including a sensor for sensing the presence of the powder-recovery module in the second space.

11. The booth of claim 1 further including an air duct coupled to the bottom wall between respective openings.

12. The booth of claim 11 wherein the air duct is coupled to an underside of the bottom wall.

13. The booth of claim 1 wherein the booth walls include a top wall that overlies the first space, the top wall including a second opening permitting passage through the booth of a portion of a conveyor system that conveys objects through the booth.

14. The booth of claim 13 wherein the first openings are elongated and extend generally parallel to the second opening.

15. The booth of claim 13 wherein the top wall has a front end and a rear end, the bottom wall has a front end and a rear end, the second opening extends between the front end of the top wall and the rear end of the top wall, each first opening terminates at a respective front end that is spaced apart from the front end of the bottom wall, and each first opening terminates at a respective rear end that is spaced apart from the rear end of the bottom wall.

16. A booth for a powder coating system that operates to dispense powder onto objects to be coated by the powder, the booth including booth walls defining a first space in which objects are powder coated, one of the booth walls being a bottom wall of the first space, the bottom wall being formed to include first openings, a second space being defined beneath the bottom wall, the second space communicating with the first space through the first openings, the second space being adapted to receive a powder-recovery module placed beneath the bottom wall for recovery through the first openings of powder which does not adhere to the objects, doors supported with respect to the bottom wall and movable between first positions closing the first openings and second positions not closing the openings, and a sensor for sensing the presence of the powder-recovery module in the second space, the sensor providing a signal for preventing movement of the doors to the first positions when the powder-recovery module is present in the second space.

17. The booth of claim 16 wherein the sensor includes a lever for engagement by the powder-recovery module as the powder-recovery module is moved into the second space.

18. A booth for a powder coating system that operates to dispense powder onto objects to be coated by the powder, the booth including booth walls defining a first space in which objects are powder coated, one of the booth walls being a bottom wall of the first space, a second space being defined beneath the bottom wall, the bottom wall being formed to include a first opening, the first space communicating with the second space through the first opening, the second space being adapted to receive a powder-recovery module placed beneath the bottom wall for recovery through the first opening of powder which does not adhere to the objects, and first actuators beneath the bottom wall for moving a powder-recovery module received in the second space between a first position spaced apart from the bottom wall and a second position engaging the bottom wall, a door supported with respect to the bottom wall and movable between a first position closing the first opening and a second position not closing the first opening, and a second actuator coupled to the door and operable to move the door between the first and second positions.

19. The booth of claim 18 further including a frame coupled to the booth walls, the first actuators being coupled to the frame.

20. The booth of claim 18 further including a lift coupled to the first actuators for engaging and lifting the powder-recovery module when the first actuators are actuated.

21. The booth of claim 18 further including a frame coupled to the booth walls, the actuator coupled to the frame.

22. The booth of claim 18 wherein the door is coupled to the bottom wall.

23. The booth of claim 18 wherein the door pivots about an axis when moving between the first and second positions.

24. The booth of claim 23 wherein the axis is the axis of a hinge for coupling the door to the bottom wall.

25. The booth of claim 23 wherein the opening is elongated and the axis is parallel to a longitudinal dimension of the opening.

26. The booth of claim 18 further including a sensor sensing the presence of a powder-recovery module in the second space, the sensor providing a signal for preventing movement of the door to the first position when the powder-recovery module is present in the second space.

27. A booth for a powder coating system that operates to dispense powder onto objects to be coated by the powder, the booth including booth walls defining a first space in which objects are powder coated, one of the booth walls being a bottom wall of the first space, the bottom wall being formed to include a first opening, a second space being defined beneath the bottom wall, the second space communicating with the first space through the opening, the second space being adapted to receive a powder-recovery module placed beneath the bottom wall for recovery through the opening of powder which does not adhere to the objects, a door supported with respect to the bottom wall, the door being movable between a first position closing the opening and a second position not closing the opening, and an actuator coupled to the door and operable to move the door between the first position and the second position.

28. The booth of claim 27 further including a frame coupled to the booth walls, the actuator coupled to the frame.

29. The booth of claim 27 wherein the door is coupled to the bottom wall.

30. The booth of claim 29 wherein the door pivots about an axis during movement between the first position and the second position.

31. The booth of claim 30 wherein the bottom wall includes a downwardly facing undersurface, the axis being the axis of a hinge coupled to the undersurface.

32. The booth of claim 27 wherein the door pivots about an axis during movement between the first position and the second position.

33. The booth of claim 32 wherein the opening is elongated slot-like and the axis is parallel to a longitudinal dimension of the opening.

34. The booth of claim 27 further including a sensor adapted to sense the presence of the powder-recovery module in the second space.

35. The booth of claim 34 wherein the sensor provides a signal for preventing movement of the door to the first position when the powder-recovery module is present in the second space.

36. The booth of claim 34 wherein the sensor includes a lever for engagement by the powder-recovery module as the powder-recovery module is moved into the second space.

37. The booth of claim 27 further including an air duct coupled to the bottom wall adjacent the opening.

38. The booth of claim 37 wherein the air duct is coupled to in underside of the bottom wall.

* * * * *